United States Patent
Zha et al.

(10) Patent No.: US 9,349,158 B2
(45) Date of Patent: May 24, 2016

(54) IMAGE INTERPOLATION METHOD AND IMAGE INTERPOLATION SYSTEM

(71) Applicant: NOVATEK Microelectronics Corp., Hsin-Chu (TW)

(72) Inventors: Lin Zha, Xi'an (CN); Chun-Wei Chen, Taipei (TW); Yuanjia Du, Jinan (CN); Chun Wang, Shanghai (CN)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 11 days.

(21) Appl. No.: 14/329,991

(22) Filed: Jul. 14, 2014

(65) Prior Publication Data

US 2016/0012566 A1  Jan. 14, 2016

(51) Int. Cl.

| | |
|---|---|
| G06K 9/32 | (2006.01) |
| H04N 7/12 | (2006.01) |
| G06T 3/40 | (2006.01) |
| G06T 5/00 | (2006.01) |
| G06T 7/00 | (2006.01) |
| G06T 7/40 | (2006.01) |
| G06K 9/52 | (2006.01) |
| G06F 17/14 | (2006.01) |

(52) U.S. Cl.
CPC ............... *G06T 3/4007* (2013.01); *G06T 5/001* (2013.01); *G06T 7/0026* (2013.01); *G06F 17/148* (2013.01); *G06K 9/527* (2013.01); *G06T 7/402* (2013.01); *G06T 2207/20064* (2013.01)

(58) Field of Classification Search
CPC .................. G06T 3/4007; G06T 2207/20064; G06T 7/0026; G06T 7/402; G06K 9/527; G06F 17/148
USPC ...................................... 382/300; 375/240.19
See application file for complete search history.

(56) References Cited

U.S. PATENT DOCUMENTS

| | | | | |
|---|---|---|---|---|
| 6,928,196 | B1 * | 8/2005 | Bradley ................... | G06T 3/403 382/199 |
| 7,085,436 | B2 * | 8/2006 | Akhan ................... | G06T 3/4084 375/240.19 |
| 7,693,351 | B2 * | 4/2010 | Sasaki ................... | G06T 3/4015 382/276 |
| 8,428,396 | B2 * | 4/2013 | He .......................... | H04N 19/59 382/260 |
| 2003/0044089 | A1 * | 3/2003 | Yamamoto ......... | H03H 17/0202 382/300 |

* cited by examiner

*Primary Examiner* — Kanjibhai Patel
(74) *Attorney, Agent, or Firm* — Winston Hsu; Scott Margo

(57) ABSTRACT

An image interpolation method is utilized for performing an interpolation on a source image to obtain a destination image. The image interpolation method includes performing a domain transformation on a plurality of pixels of the source image to generate a plurality of first coefficients and a plurality of second coefficients; respectively determining an data interrelationship degree in at least one direction of each first coefficient to generate a plurality of direction results; performing a first interpolation process on the plurality of first coefficients according to the plurality of direction results to generate a plurality of first destination coefficients; performing a second interpolation process on the plurality of second coefficients to generate a plurality of second destination coefficients; performing a reverse domain transformation on the plurality of first destination coefficients and the plurality of second destination coefficients to obtain the destination image.

25 Claims, 8 Drawing Sheets

IMAGE INTERPOLATION METHOD AND IMAGE INTERPOLATION SYSTEM

BACKGROUND OF THE INVENTION

1. Field of the Invention

The present invention relates to an image interpolation method and an image interpolation system, and more particularly, to an image interpolation method and an image interpolation system capable of enhancing definition of interpolated images and avoiding saw-toothed phenomenon on object edges of the interpolated images.

2. Description of the Prior Art

Display devices may perform interpolations on a source image for increasing a pixel number of the source image and generating a interpolated image with a higher resolution. For example, a high resolution image with 1024×768 pixels can be acquired by performing the interpolations on a source image with 640×480 pixels, such that the unaided eyes can clearly perceive the images with the high resolutions.

In the prior art, the interpolation methods perform the interpolation operations by performing the linear interpolation once, twice, or three times on a plurality of source pixels, for acquiring interpolated pixels within locations of the source pixels. For example, the interpolated pixel may be acquired by dividing the sum of pixel values of source pixels A and B of the source image by 2. However, the abovementioned methods only perform linear operations on the source pixels around the pixels being interpolated and does not consider the correlation degrees between source pixels on different directions, resulting unclearness of the interpolated images or saw-toothed phenomenon on object edges of the interpolated images. As can be seen from the above, the prior art needs to be improved

SUMMARY OF THE INVENTION

Therefore, the present invention provides an image interpolation method and an image interpolation system capable of enhancing image definitions of interpolated images and avoid saw-toothed phenomenon on object edges of the interpolated images.

The present invention discloses an image interpolation method, for performing an interpolation on a source image to obtain a destination image. The image interpolation method comprises performing a domain transformation on a plurality of pixels of the source image, for generating a plurality of first coefficients and a plurality of second coefficients corresponding to the plurality of pixels; analyzing and calculating a data correlation degree in at least one direction of each first coefficient according to a plurality of pixel locations of the plurality of pixels, respectively, for generating a plurality of direction results corresponding to the plurality of first coefficients; performing a first interpolation process on the plurality of first coefficients according to the plurality of directional results, for generating a plurality of first destination coefficients; performing a second interpolation process on the plurality of first coefficients, for generating a plurality of second destination coefficients; and performing an inverse domain transformation on the plurality of first destination coefficients and the plurality of second destination coefficients, for generating the plurality of destination pixels of the destination image.

The present invention further discloses an image interpolation system, for interpolating a source image to obtain a destination image. The image interpolation system comprises a transformation module, performing a domain transformation on a plurality of pixels of the source image, for generating a plurality of first coefficients and a plurality of second coefficients corresponding to the plurality of pixels; an analysis module, following the domain transformation module, for analyzing and calculating a data correlation degree in at least one direction of each first coefficient according to a plurality of pixel locations of the plurality of pixels, respectively, for generating a plurality of direction results corresponding to the plurality of first coefficients; a first interpolation module, following the domain transformation module and the analysis module, for performing a first interpolation process on the plurality of first coefficients according to the plurality of directional results, for generating a plurality of first destination coefficients; a second interpolation module, following the domain transformation module, for performing a second interpolation process on the plurality of first coefficients, for generating a plurality of second destination coefficients; and an inverse transformation module, following the first interpolation module and the second interpolation module, for performing an inverse domain transformation on the plurality of first destination coefficients and the plurality of second destination coefficients, for generating the plurality of destination pixels of the destination image.

These and other objectives of the present invention will no doubt become obvious to those of ordinary skill in the art after reading the following detailed description of the preferred embodiment that is illustrated in the various figures and drawings.

DETAILED DESCRIPTION

In the following exemplified embodiments, an image interpolation system reads a source images and performs interpolation operations for generating a destination images according to image interpolation processes. After performing a domain transformation on pixel data of the source pixels for acquiring related coefficients, the image interpolation system performs direction analysis and directional interpolations on the coefficients with high-frequency components, to enhance definition of the destination image and avoid saw-toothed phenomenon on object edges of the interpolated images. The present invention is particularly shown and described with respect to at least one exemplary embodiment accompanied with drawings.

Figure 1:
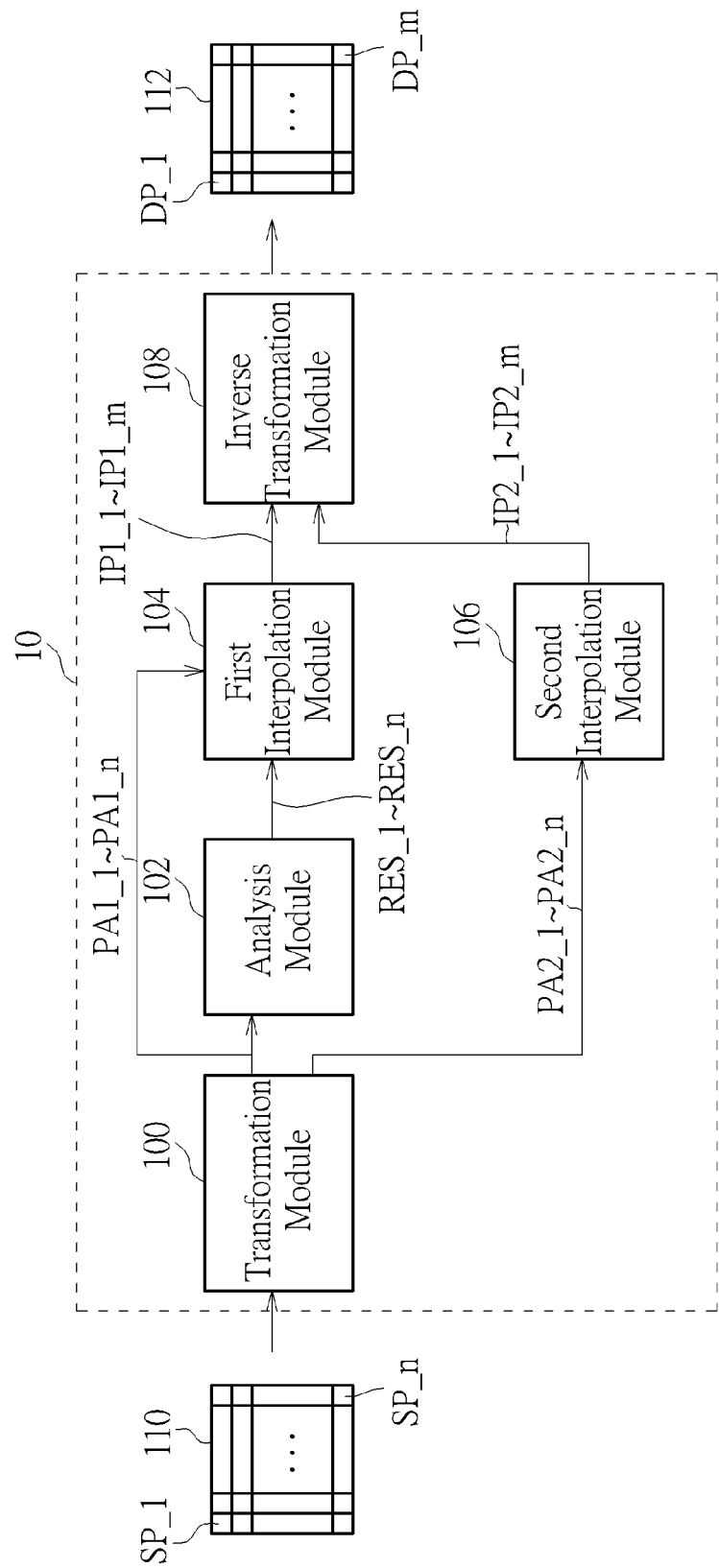
FIG. 1 is a schematic diagram of an image interpolation system according to an embodiment of the present invention.

Please refer to FIG. 1, which is a schematic diagram of an image interpolation system 10 according to an embodiment of the present invention. As shown in FIG. 1, the image interpolation system 10 comprises a transformation module 100, an analysis module 102, a first interpolation module 104, a second interpolation module 106 and an inverse transformation module 108. The image interpolation system 10 is utilized in electronic devices such as computers, smart TVs, smartphones, tablets. The image interpolation system 10 reads a source image 110, performs an interpolation operation, and generates a destination image 112, so as to increase a number of pixels of the source image 110 and generate the destination image 112 with a higher resolution. The source image 110 comprises pixels SP_1-SP_n, and the destination image 112 comprises pixels DP_1-DP_m, wherein a number of pixels of the destination image 112 is greater than that of the source image 110 (i.e., a total number of pixels DP_1-DP_m is greater than that of the pixels SP_1-SP_n). The source image 110 and destination image 112 are 2-dimension (2D) images, e.g., static photos, frames of dynamic video, and multiple viewing perspective 2D images for demonstrating 3-dimension images, and are not limited herein.

In detail, the transformation module 100 performs a domain transformation on the pixels SP_1-SP_n of the source image 110, for generating the coefficients PA1_1-PA1_$n$ and PA2_1-PA2_$n$. The Domain transformation converts the pixels SP_1-SP_n of the source image 110 to another domain such as the frequency domain. For example, common domain transformations are Fourier transformation and wavelet transformation. According to different applications, the domain transformation can be appropriately modified. The following takes wavelet transformation as an example. Wavelet transformation is an extension of Fourier transformation. In comparison with Fourier transformation which utilizes trigonometric functions as bases, wavelet transformation utilizes wavelet functions as bases. The so-called "wavelet" is defined as a waveform with finite duration and zero mean and the wavelet functions are functions with localizations in both time domain and frequency domain. Wavelet transformation shifts and expands the analyzed signal via expanding or contracting the wavelet functions In practice, discrete wavelet transformation is usually used with a low pass filter and a high pass filter for analyzing low-frequency approximation coefficients and high-frequency detail coefficients of signals. Wavelet transformation should be well-known and widely discussed by those with ordinary skill in the art, and are not narrated herein for brevity.

Since the pixels SP_1-SP_n are 2D information of the source image 110, after the transformation module 100 performs 2D discrete wavelet transformation on the pixels SP_1-SP_n the transformation module 100 generates low-frequency approximation coefficients and high-frequency detail coefficients on a horizontal direction and a vertical direction via a high pass filter and a low pass filter. Hence, the coefficients generated by the transformation module 100 comprise four sets of coefficients with different frequency components on the horizontal direction and the vertical direction. That is, the four sets of coefficients comprise coefficients PAll_1-PAll_n with the low frequency components on both the horizontal direction and the vertical direction, coefficients PAlh_1-PAlh_n with the low frequency components on the horizontal direction and the high frequency components on the vertical direction, coefficients PAhl_1-PAhl_n with the high frequency components on the horizontal direction and the low frequency components on the vertical direction, and coefficients PAhh_1-PAhh_n with the high frequency components on both the horizontal direction and the vertical direction. Moreover, the four sets of coefficients are corresponding to the pixels SP_1-SP_n (i.e. a total number of the coefficients PAll_1-PAll_n, a total number of the coefficients PAlh_1-PAlh_n, a total number of the coefficients PAhl_1-PAhl_n, and a total number of the coefficients PAhh_1-PAhh_n are all the same as the total number of the pixels SP_1-SP_n) and have the location information of the pixels SP_1-SP_n in the source image 110.

According to different domain transformations, the transformation module 100 may convert the data of the pixels SP_1-SP_n into multiple sets of coefficients with the high-frequency components and the low-frequency components (e.g., the abovementioned coefficients PAll_1-PAll_n PAlh_1-PAlh_n, PAhl_1-PAhl_n, and PAhh_1-PAhh_n generated by the wavelet transformation). For the purpose of explaining the technical characteristics of performing different interpolation operations on the coefficients with high-frequency components and the coefficients with the low-frequency components in the present invention, the coefficients PA1_1-PA1_$n$ represents a coefficients set of a plurality of coefficient sets with the high-frequency components, and the coefficients PA2_1-PA2_$n$ represents a coefficients set of a plurality of coefficient sets with the low-frequency components. For wavelet transformation, the coefficients PA1_1-PA1_$n$ represent the coefficients PAlh_1-PAlh_n, PAhl_1-PAhl_n, or PAhh_1-PAhh_n, which are the coefficients with high-frequency components on horizontal direction or vertical direction; and the coefficients PA2_1-PA2_$n$ represent the coefficients PAll_1-PAll_n, which are coefficients with the low-frequency components on both the horizontal direction and the vertical direction. The interpolation operations performed on the coefficients PA1_1-PA1_$n$ hereinafter are regarded as the interpolation operations performed on the coefficients PAlh_1-PAlh_n, PAhl_1-PAhl_n, and PAhh_1-PAhh_n, respectively.

The analysis module 102 is coupled to the transformation module 100 and stores directions DIR_1-DIR_k in advance. The directions DIR_1-DIR_k may be direction angle values based on a reference horizontal line and stored in the analysis module 102. A total number of the directions DIR_1-DIR_k may vary according to different requirements, and is not limited. When the total number of the directions DIR_1-DIR_k becomes greater, the operations required to be performed by the analysis module 102 increase. Hence, computing resource and time consumed by the analysis module 102 becomes greater, and the analysis results acquired by the analysis module 102 become more precise. Since the coefficients PA1_1-PA1_$n$ contain the location information of the pixels SP_1-SP_n of the source image 110, the analysis module 102 calculates data correlation degrees between each of the coefficients PA1_1-PA1_$n$ and others of the coefficients PA1_1-PA1_$n$ in the directions DIR_1-DIR_k according to the location information of the coefficients PA1_1-PA1_$n$ after receiving the coefficients PA1_1-PA1_$n$ generated by the transformation module 100. Finally, the analysis module 102 analyzes the data correlation degrees of each of the coefficients PA1_1-PA1_$n$ in the directions DIR_1-DIR_k, for acquiring a direction with the maximum data correlation degree of each the coefficients PA1_1-PA1_$n$ (which is one of the directions DIR_1-DIR_k) as direction results RES_1-RES_n of the coefficients PA1_1-PA1_$n$. The direction results RES_1-RES_n comprise direction angle values and direction confidence values, for providing information of performing interpolation operation with direction characteristics to the first interpolation module 104.

For example, the analysis module 102 first calculates the data correlation degrees between the coefficients PA1_1 and other coefficients in the directions DIR_1-DIR_k and proceeds analysis, for acquiring that the coefficient PA1_1 has the maximum data correlation degree in a direction DIR_x among the directions DIR_1-DIR_k. Hence, the analysis module 102 generates a direction angle value and a direction confidence value related to the direction DIR_x as the direction result RES_1 of the coefficients PA1_1. Next, the analysis module 102 calculates the data correlation degrees of the coefficients PA1_2-PA1_n in the directions DIR_1-DIR_k and proceeds analysis, for acquiring the direction results RES_2-RES_n.

The first interpolation module 104 is coupled to the transformation module 100 and the analysis module 102 for performing a first interpolation process on the coefficients PA1_1-PA1_n and generating interpolated coefficients TP1_1-TP1_g between the coefficients PA1_1-PA1_n. The first interpolation module 104 combines the coefficients PA1_1-PA1_n with the interpolated coefficients TP1_1-TP1_g as destination coefficients IP1_1-IP1_m. First of all, the first interpolation module 104 acquires the interpolation direction results of the interpolated coefficients TP1_1-TP1_g from the direction results RES_1-RES_n of the coefficients PA1_1-PA1_n, wherein the interpolation direction results comprise the direction angle values and the direction confidence values, hereinafter called interpolation direction angle values and interpolation direction confidence values of the coefficients TP1_1-TP1_g. Second, the first interpolation module 104 acquires relative coefficients from the coefficients PA1_1-PA1_n according to the interpolation direction angle values of the interpolated coefficients TP1_1-TP1_g for performing directional interpolation operations and generating directional interpolation values of the interpolated coefficients TP1_1-TP1_g. Meanwhile, based on linear algorithms, the first interpolation module 104 acquires relative coefficients from the coefficients PA1_1-PA1_n and performs isotropic interpolation operations, for generating isotropic interpolation values of the interpolated coefficients TP1_1-TP1_g. Linear algorithms may comprise performing the linear interpolation once, twice or more times, and is not limited herein. Finally, the first interpolation module 104 performs operations on the directional interpolation values and isotropic interpolation values of the interpolated coefficients TP1_1-TP1_g according to the interpolation direction confidence values of the interpolated coefficients TP1_1-TP1_g, for generating the interpolated coefficients TP1_1-TP1_g. The first interpolation module 104 combines the interpolated coefficients TP1_1-TP1_g with the coefficients PA1_1-PA1_n, for generating the destination coefficients IP1_1-IP1_m.

The second interpolation module 106 is coupled to the transformation module 100 for performing a second interpolation process on the coefficients PA2_1-PA2_n and generating interpolated coefficients TP2_1-TP2_g between the coefficients PA2_1-PA2_n. The second interpolation module 106 combines the coefficients PA2_1-PA2_n with the interpolated coefficients TP2_1-TP2_g as destination coefficients IP2_1-IP2_m. The second interpolation process performed by the second interpolation module 106 performs the interpolation operation according to the linear algorithm, for acquiring the interpolated coefficients TP2_1-TP2_g and combining the interpolated coefficients TP2_1-TP2_g with the coefficients PA2_1-PA2_n as the destination coefficients IP2_1-IP2_m. Linear algorithms may comprise performing the linear interpolation once, twice or more times, and is not limited herein.

The inverse transformation module 108 is coupled to the first interpolation module 104 and the second interpolation module 106 for performing an inverse domain transformation, which is corresponding to the domain transformation performed in the transformation module 100, on the destination coefficients IP1_1-IP1_m generated by the first interpolation module 104 and the destination coefficients IP2_1-IP2_m generated by the second interpolation module 106, for converting the destination coefficients IP1_1-IP1_m and IP2_1-IP2_m in the frequency domain back onto the spatial domain and acquiring the destination image 112. For the purpose of explaining the technical characteristics of performing different interpolation operations on coefficients with the high-frequency components and the low-frequency components in the present invention, the coefficients PA1_1-PA1_n represents the coefficients set of a plurality of coefficient sets with the high-frequency components and the coefficients PA2_1-PA2_n represents the coefficients set of a plurality coefficient sets with the low-frequency components. In practice, the analysis module 102, the first interpolation module 104, and the second interpolation module 106 perform operations on the plurality of correlation sets, respectively, for generating a plurality of sets of interpolated coefficients. The inverse transformation module 108 performs the inverse domain transformations on the plurality of sets of interpolated coefficients according to the different domain transformations, for acquiring the pixels DP_1-DP_m of the destination image 112.

In an embodiment of using wavelet transformation, the transformation module 100 converts the pixels SP_1-SP_n into the coefficients PAlh_1-PAlh_n, PAhl_1-PAhl_n, and the coefficients PAhh_1-PAhh_n with the high-frequency components in the horizontal direction or the vertical direction (i.e. the coefficients PA1_1-PA1_n) and the coefficients PAll_1-PAll_n with the low-frequency components in both the horizontal direction and the vertical direction (i.e. the coefficients PA2_1-PA2_n). After the operations of the analysis module 102, the first interpolation module 104, and the second interpolation module 106 achieve, the destination coefficients derived from interpolating the coefficients PAlh_1-PAlh_n, PAhl_1-PAhl_n, and PAhh_1-PAhh_n (i.e., one set of the destination coefficients IP1_1-IP1_m) and the destination coefficients derived from interpolating the coefficients PAll_1-PAll_n (i.e. the destination coefficients IP2_1-IP2_m) can be acquired. In such a situation, the inverse transformation module 108 performs the inverse transformation on the destination coefficients IP1_1-IP1_m and IP2_1-IP2_m (i.e. performing the inverse wavelet transformation on the coefficients derived from interpolating the coefficients PAll_1-PAll_n, PAlh_1-PAlh_n, PAhl_1-PAhl_n and PAhh_1-PAhh_n), for generating the pixels DP_1-DP_m of the destination image 112.

Noticeably, the transformation module 100, the analysis module 102, the first interpolation module 104, the second interpolation module 106 and the inverse transformation module 108 can be implemented by application-specific integrated circuits (ASIC), or by storing programming code in a storage device and instructing processor(s) to perform operations. Except for implementing the image interpolation system 10 via the transformation module 100, the analysis module 102, the first interpolation module 104, the second interpolation module 106 and the inverse transformation module 108, the image interpolation system 10 can be directly implemented by processor(s) and storage devices.

That is, all the operation process of the transformation module 100, the analysis module 102, the first interpolation module 104, the second interpolation module 106 and the inverse transformation module 108 are stored as programming codes in storage devices for instructing processor(s) to perform all the operations. The storage devices may be read-only memory (ROM), random-access memory (RAM), CD-ROMs, magnetic tapes, floppy disks, optical data storage devices, etc, and are not limited herein. Furthermore, the image interpolation system 10 may also be implemented directly by ASIC, and is not limited herein.

In short, the image interpolation system 10 performs a domain transformation on the pixels SP_1-SP_n of the source image 110 by the transformation module 100 for acquiring the coefficients PA1_1-PA1_$n$ with the high-frequency components and the coefficients PA2_1-PA2_$n$ with the low-frequency components. Meanwhile, the image interpolation system 10 utilizes the analysis module 102 to perform relative direction analysis of the coefficients PA1_1-PA1_$n$ with the high-frequency components, for generating the direction results RES_1-RES_n of the coefficients PA1_1-PA1_$n$. Next, the image interpolation system 10 performs interpolation operations having direction characteristics on the interpolated coefficients between the coefficients PA1_1-PA1_$n$ according to the direction results RES_1-RES_n. That is, the image interpolation system 10 performs interpolation in a direction with maximum data correlation degree for generating the interpolated coefficients, and accordingly acquires the destination coefficients IP1_1-IP1_$m$. In addition, the image interpolation system 10 also performs linear interpolations on the coefficients PA2_1-PA2_$n$ with the low-frequency components, for acquiring the destination coefficients IP2_1-IP2_$m$. Finally, the image interpolation system 10 performs the inverse domain transformation on the destination coefficients IP1_1-IP1_$m$ and IP2_1-IP2_$m$ via the inverse transformation module 108, for acquiring the interpolated image of the source image 110 (i.e. the destination image 112). Since the image interpolation system 10 performs interpolation operations with direction characteristics on the coefficients PA1_1-PA1_$n$ with the high-frequency components, the image interpolation system 10 generates the higher definition destination image 112 without saw-toothed phenomenon after performing interpolation operations with direction characteristics on the object edges of the source image 110 (i.e. on the coefficients PA1_1-PA1_$n$ with the high-frequency components).

Figure 2:
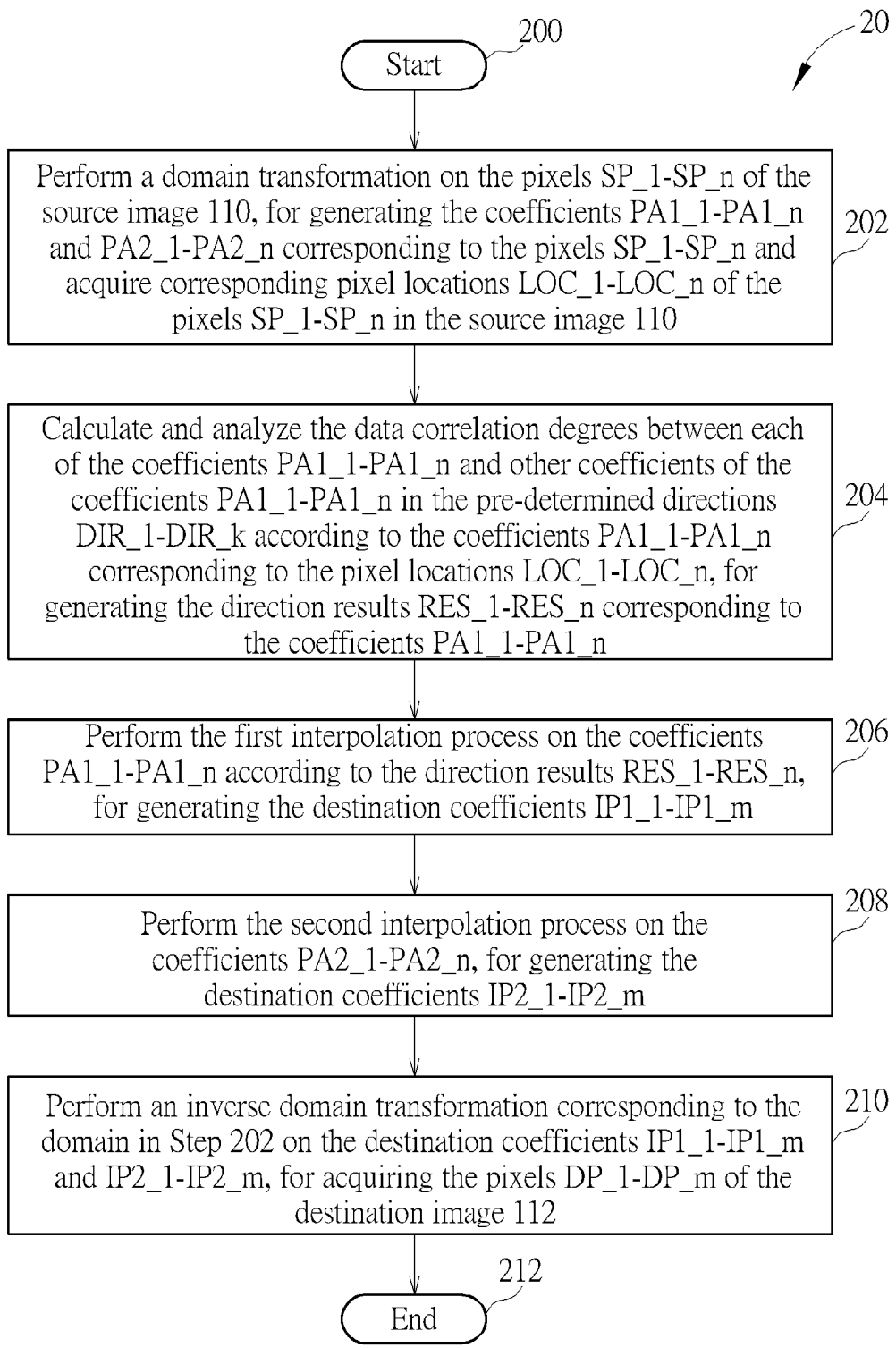
FIG. 2 is a flowchart of a data interpolation process according to an embodiment of the present invention.

The process of the data interpolation system 10 reading the source image 110 and generating the destination image 112 can be summarized into a process 20. Please refer to FIG. 2, which is a flowchart of a data interpolation process 20 according to an embodiment of the present invention. The data interpolation process 20 is implemented by the transformation module 100, the analysis module 102, the first interpolation module 104, the second interpolation module 106 and the inverse transformation module 108 of the data interpolation system 10. In addition, the data interpolation process 20 may be compiled into the programming code stored in storage devices of the data interpolation system 10 and performed by the processor(s) of the data interpolation system 10, to read the source image 110, perform operations and generate the destination image 112. As shown in FIG. 2, the data interpolation process 20 comprises the following steps:

Step 200: Start.

Step 202: Perform a domain transformation on the pixels SP_1-SP_n of the source image 110, for generating the coefficients PA1_1-PA1_$n$ and PA2_1-PA2_$n$ corresponding to the pixels SP_1-SP_n and acquire corresponding pixel locations LOC_1-LOC_n of the pixels SP_1-SP_n in the source image 110.

Step 204: Calculate and analyze the data correlation degrees between each of the coefficients PA1_1-PA1_$n$ and other coefficients of the coefficients PA1_1-PA1_$n$ in the pre-determined directions DIR_1-DIR_k according to the coefficients PA1_1-PA1_$n$ corresponding to the pixel locations LOC_1-LOC_n, for generating the direction results RES_1-RES_n corresponding to the coefficients PA1_1-PA1_$n$.

Step 206: Perform the first interpolation process on the coefficients PA1_1-PA1_$n$ according to the direction results RES_1-RES_n, for generating the destination coefficients IP1_1-IP1_$m$.

Step 208: Perform the second interpolation process on the coefficients PA2_1-PA2_$n$, for generating the destination coefficients IP2_1-IP2_$m$.

Step 210: Perform an inverse domain transformation corresponding to the domain in Step 202 on the destination coefficients IP1_1-IP1_$m$ and IP2_1-IP2_$m$, for acquiring the pixels DP_1-DP_m of the destination image 112.

Step 212: End.

According to the data interpolation process 20, the data interpolation system 10 performs the domain transformation on the pixels SP_1-SP_n, proceeds direction analysis on the transformed coefficients PA1_1-PA1_$n$ for generating the direction results RES_1-RES_n, and performs the first interpolation process with direction characteristics on the coefficients PA1_1-PA1_$n$, so as to acquire the destination image 112 with high definition and without the saw-toothed phenomenon.

In detail, in Step 202, the data interpolation system 10 performs a domain transformation, such as Fourier transformation or wavelet transformation, on the pixels SP_1-SP_n of the source image 110. A plurality of sets of coefficients with the high-frequency components and the low-frequency components are generated after the domain transformation on the pixels SP_1-SP_n. For the purpose of clearly and simply explaining the operation process about the coefficients PA1_1-PA1_$n$ and the coefficients PA2_1-PA2_$n$ in this embodiment, the coefficients PA1_1-PA1_$n$ represents one coefficients set of the plurality of coefficients sets with the high-frequency components and the coefficients PA2_1-PA2_$n$ represents one coefficients set of the plurality of coefficients sets with the low-frequency components. Noticeably, for wavelet transformation, the coefficients PA1_1-PA1_$n$ represent the coefficients having the high-frequency components on the horizontal direction or the vertical direction; the coefficients PA2_1-PA2_$n$ represent coefficients having the low-frequency components on both the horizontal direction and the vertical direction.

Since the source image 110 is a 2D image, the pixels SP_1-SP_n of the source image 110 have the corresponding pixel locations LOC_1-LOC_n in a 2D coordinate system formed by 2 coordinate axes. Thus, the coefficients PA1_1-PA1_$n$ and PA2_1-PA2_$n$ have the location information, i.e. corresponding to the locations LOC_1-LOC_n of the pixels SP_1-SP_n in the source image 110.

In Step 204, the data interpolation system 10 calculates the data correlation degrees between each coefficient of the coefficients PA1_1-PA1_$n$ and other coefficients of the coefficients PA1_1-PA1_$n$ in the directions DIR_1-DIR_k and proceeds analysis plus decision, for acquiring a direction with the maximum data correlation degree (which is one of the directions DIR_1-DIR_k) of each coefficient one by one, so as to generate the direction results RES_1-RES_n of the coefficients PA1_1-PA1_n. The directions DIR_1-DIR_k can be stored as direction angle values in the analysis module 102, for providing information for analyzing the coefficients PA1_1-PA1_n. A total number of the directions DIR_1-DIR_k is determined according to the computation requirements of the data interpolation system 10. When the total number of the directions DIR_1-DIR_k increases, the direction result becomes more accurate but consuming more computing costs.

For the following, takes a coefficient PA1_x of the coefficients PA1_1-PA1_n as an example. According to the corresponding location information of the coefficients PA1_1-PA1_n(i.e., the pixel locations LOC_1-LOC_n), the interpolation system 10 acquires correlated coefficients from the coefficients PA1_1-PA1_n which passes through the location of the coefficients PA1_x and is on the directions DIR_1-DIR_k, for generating analysis information of the coefficient PA1_x related to the directions DIR_1-DIR_k. A total number of correlated coefficients may vary according to the practical requirements. If the total number of correlated coefficients increases, the analysis results become more accurate but consuming more computing cost.

Second, the data interpolation system 10 performs operations according to an energy algorithm and a variance algorithm on the correlated coefficients of analysis data of the coefficient PA1_x related to the directions DIR_1-DIR_k, for generating energy values Ex_1-Ex_k and variances Vx_1-Vx_k on the directions DIR_1-DIR_k related to the coefficient PA1_x. The data interpolation system 10 proceeds analysis on the energy values Ex_1-Ex_k and variances Vx_1-Ex_k of the coefficient PA1_x, for acquiring a representative direction DIR_x (i.e., one of the directions DIR_1-DIR_k) with the maximum data correlation degree of the coefficient PA1_x with other coefficients. That is, the coefficient PA1_x has the maximum correlation degree with other coefficients on the representative direction DIR_x.

Finally, the data interpolation system 10 generates a direction angle value related to the representative direction DIR_x, acquires an energy Ex_x and a variance Vx_x corresponding to the representative direction DIR_x from energy values Ex_1-Ex_k and variances Vx_1-Vx_k, and performs operations on the energy Ex_x and the variance Vx_x, for generating a direction confidence value related to the representative direction DIR_x. As a result, the data interpolation system 10 generates a direction result RES_x of the coefficient PA1_x, which comprises a direction angle value and a direction confidence value of the representative direction DIR_x. The direction angle value and direction confidence value of the direction result RES_x are utilized for providing the first interpolation module 104 the direction information for performing the directional interpolation operations with the direction characteristics.

Similarly, the data interpolation system 10 proceeds the abovementioned direction analysis process on the rest of the coefficients PA1_1-PA1_n, for generating the direction results RES_1-RES_n corresponding to the coefficients PA1_1-PA1_n. That is, the data interpolation system 10 acquires the directions with the maximum data correlation degrees from the directions DIR_1-DIR_k of the coefficients PA1_1-PA1_n as the direction results RES_1-RES_n of the coefficients PA1_1-PA1_n, and further utilizes the direction results RES_1-RES_n to compute the interpolated coefficients between the coefficients PA1_1-PA1_n, such that the interpolated coefficients are more precise and the definition of interpolated image increases.

Figure 3:
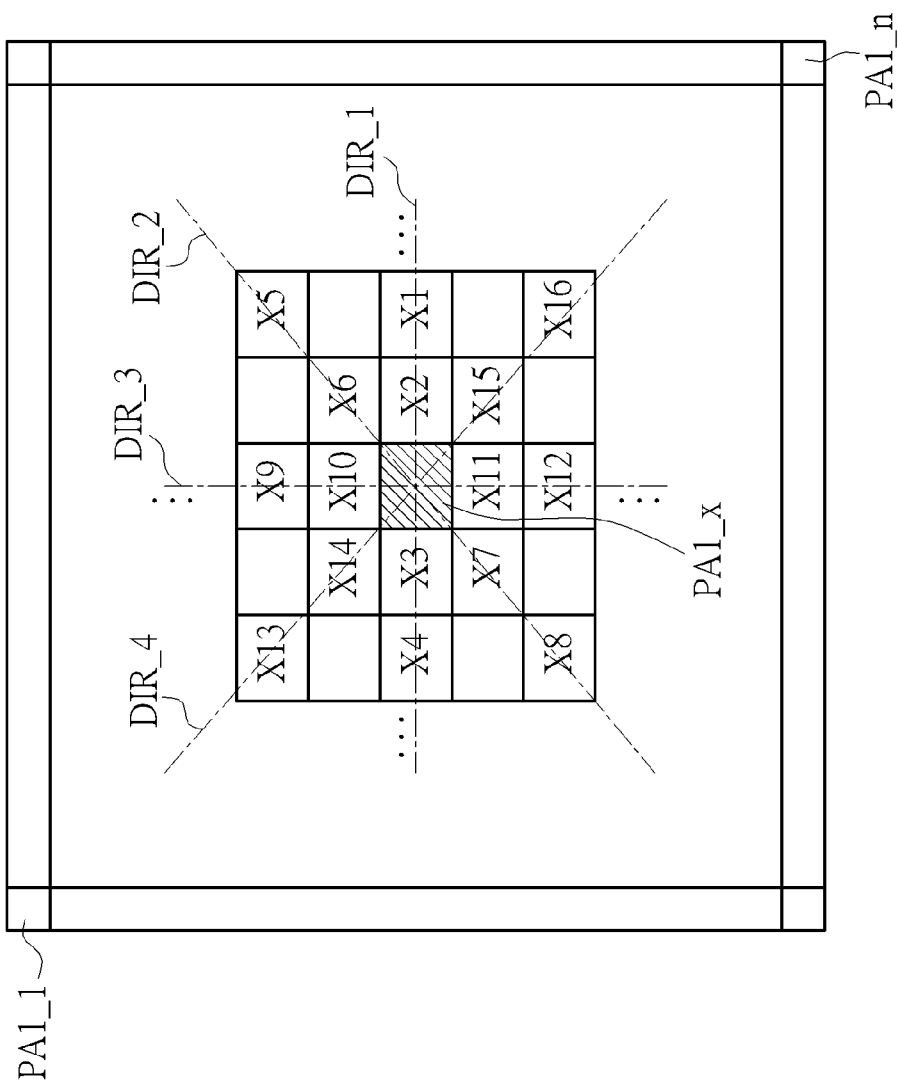
FIG. 3 is a schematic diagram of performing direction analysis on a coefficient shown in FIG. 1.

As to the details of the abovementioned direction analysis of the data interpolation system 10 please refer to FIG. 3. FIG. 3 is a schematic diagram of performing direction analysis on the coefficient PA1_x of the coefficients PA1_1-PA1_n shown in FIG. 1. As shown in FIG. 3, the coefficients PA1_1-PA1_n have the pixel locations LOC_1-LOC_n of the pixels SP_1-SP_n in the source image 110. The data interpolation system 10 desires to perform direction analysis on the directions DIR_1-DIR_4 (labeled as dash lines in FIG. 3), wherein the directions DIR_1-DIR_4 can be regarded as the direction angles with 0 degree, 45 degrees, 90 degrees and 135 degrees under the condition of taking a reference horizontal line as the standard 0 degree.

First of all, the data interpolation system 10 acquires a pixel location corresponding to the coefficient PA1_x. The pixel location is marked as a square with slash lines at the center of FIG. 3, hereinafter called an analysis location. According to the pixel locations LOC_1-LOC_n corresponding to the coefficients PA1_1-PA1_n, the data interpolation system 10 starts from the analysis location as center and acquires coefficients from the coefficients PA1_1-PA1_n which pass through the analysis location and are on the directions DIR_1-DIR_4, for generating analysis data related to the directions DIR_1-DIR_4. In such a situation, the data interpolation system 10 acquires the coefficient PA1_x and the coefficients X1-X4 as the analysis data on the direction DIR_1, acquires the coefficient PA1_x and the coefficients X5-X8 as the analysis data on the direction DIR_2, acquires the coefficient PA1_x and the coefficients X9-X12 as the analysis data on the direction DIR_3, and acquires the coefficient PA1_x and the coefficients X13-X16 as the analysis data on the direction DIR_4, wherein the coefficients X1-X16 can be the correlated coefficients of the coefficient PA1_x on the directions DIR_1-DIR_4 even if the coefficients X1-X16 are the coefficients of the coefficients PA1_1-PA1_n. Noticeably, a total number of correlated coefficients (which pass through the coefficient PA1_x and are on the directions DIR_1-DIR_4) acquired by the data interpolation system 10 may vary according to practical requirements. When the number of the correlated coefficients increases, the analysis results become more accurate but consuming more computing cost.

Second, the data interpolation system 10 performs operations according to the energy algorithm and the variance algorithm on the correlated coefficients X1-X16, for generating energy values Ex_1-Ex_4 and variances Vx_1-Vx_4 on the directions DIR_1-DIR_4 of the coefficient PA1_x. In the energy algorithm, the data interpolation system 10 performs the following operations on the coefficient PA1_x and the coefficients X1-X16 for generating the energy values Ex_1-Ex_4 along the directions DIR_1-DIR_4 of the coefficient PA1_x:

Energy $Ex\_1=(|PA1\_x|+|X1|+|X2|+|X3|+|X4|)/5$,
Energy $Ex\_2=(|PA1\_x|+|X5|+|X6|+|X7|+|X8|)/5$,
Energy $Ex\_3=(|PA1\_x|+|X9|+|X10|+|X11|+|X12|)/5$,
Energy $Ex\_4=(|PA1\_x|+|X13|+|X14|+|X15|+|X16|)/5$.

In the above operations, the following descriptions take the energy Ex_1 as an example. The energy algorithm is taking an arithmetic mean of absolute values of the coefficient PA1_x and the coefficients X1-X4 for acquiring the energy Ex_1. In another embodiment, the energy algorithm may calculate an arithmetic mean of square values of the coefficient PA1_x and the coefficients X1-X4 for acquiring the energy Ex_1. The energy algorithm can be accordingly modified, and is not limited herein.

In the variance algorithm, the data interpolation system 10 performs the following operations on the coefficient PA1_x and the coefficients X1-X16 for generating average values Av_1-Av_4:

Average Av_1=(PA1_$x$+X1+X2+X3+X4)/5,
Average Av_2=(PA1_$x$+X5+X6+X7+X8)/5,
Average Av_3=(PA1_$x$+X9+X10+X11+X12)/5,
Average Av_4=(PA1_$x$+X13+X14+X15+X16)/5.

Then, the data interpolation system 10 further performs following operations on the average values Av_1-Av_4, the coefficient PA1_$x$ and the coefficients X1-X16 for generating variances Vx_1-Vx_4:

$$\text{Variance Vx\_1} = \frac{(|PA1\_x - Av\_1| + |X1 - Av\_1| + |X2 - Av\_1| + |X3 - Av\_1| + |X4 - Av\_1|)}{5},$$

$$\text{Variance Vx\_2} = \frac{(|PA1\_x - Av\_2| + |X5 - Av\_2| + |X6 - Av\_2| + |X7 - Av\_2| + |X8 - Av\_2|)}{5},$$

$$\text{Variance Vx\_3} = \frac{(|PA1\_x - Av\_3| + |X9 - Av\_3| + |X10 - Av\_3| + |X11 - Av\_3| + |X12 - Av\_3|)}{5},$$

$$\text{Variance Vx\_4} = \frac{(|PA1\_x - Av\_4| + |X13 - Av\_4| + |X14 - Av\_4| + |X15 - Av\_4| + |X16 - Av\_4|)}{5}.$$

The following descriptions take the variance Vx_1 as an example. The variance algorithm calculates an arithmetic mean of absolute values of differences between the average value Av_1 and the coefficients PA1_$x$, X1-X4, for acquiring the variance Vx_1. In another embodiment, the variance algorithm may calculate an arithmetic mean of square values of differences between the average value Av_1 and the coefficients PA1_$x$, X1-X4, for acquiring the variance Vx_1. The variance algorithm can be accordingly modified, and is not limited herein.

Third, the data interpolation system 10 proceeds analysis on the energy values Ex_1-Ex_4 and the variances Vx_1-Vx_4, for acquiring a representative direction DIR_x with maximum data correlation degree (which is one of the directions DIR_1-DIR_k) of the coefficient PA1_$x$. The data interpolation system 10 may evaluate the energy values Ex_1-Ex_4 and determines the direction corresponding to the maximum value of the energy values Ex_1-Ex_4 as the representative direction DIR_x with the maximum data correlation degree. In another embodiment, the data interpolation system 10 may evaluate the variances Vx_1-Vx_4, and determines the direction corresponding to the minimum value of the variances Vx_1-Vx_4 as the representative direction DIR_x with the maximum data correlation degree. In still another embodiment, the data interpolation system 10 may perform additional operations on the energy values Ex_1-Ex_4 and the variances Vx_1-Vx_4. For example, the data interpolation system 10 may multiply the energy values Ex_1-Ex_4 by the variances Vx_1-Vx_4, respectively, for acquiring operation values Cp_1-Cp_4, and evaluate the operation values Cp_1-Cp_4, for acquiring the direction corresponding to the maximum value, the minimum value or the value closest to an expected value among the operation value Cp_1-Cp_4 as the representative direction DIR_x with the maximum data correlation degree. The method of determining the representative direction DIR_x with the maximum data correlation degree according to the energy values Ex_1-Ex_4 and the variances Vx_1-Vx_4 can be modified accordingly, and is not limited herein.

After the data interpolation system 10 acquires the representative energy Ex_x and the representative variance Vx_x of the representative direction DIR_x from the energy values Ex_1-Ex_4 and the variances Vx_1-Vx_4, the data interpolation system 10 divides the difference between the representative energy and the representative variance by the representative energy, generates a representative confidence value, and limits (truncates) the representative confidence value to be within 0 and 1. The representative confidence value is the direction confidence value of the coefficient PA1_$x$ along the direction DIR_x. The representative confidence value is set as 1 when the representative confidence value is greater than 1 and the representative confidence value is set as 0 when the representative confidence value is smaller than 0. As a result, the data interpolation system 10 generates the direction result RES_x of the coefficient PA1_$x$ comprising the direction angle value and the direction confidence value of the representative direction DIR_x.

Figure 4:
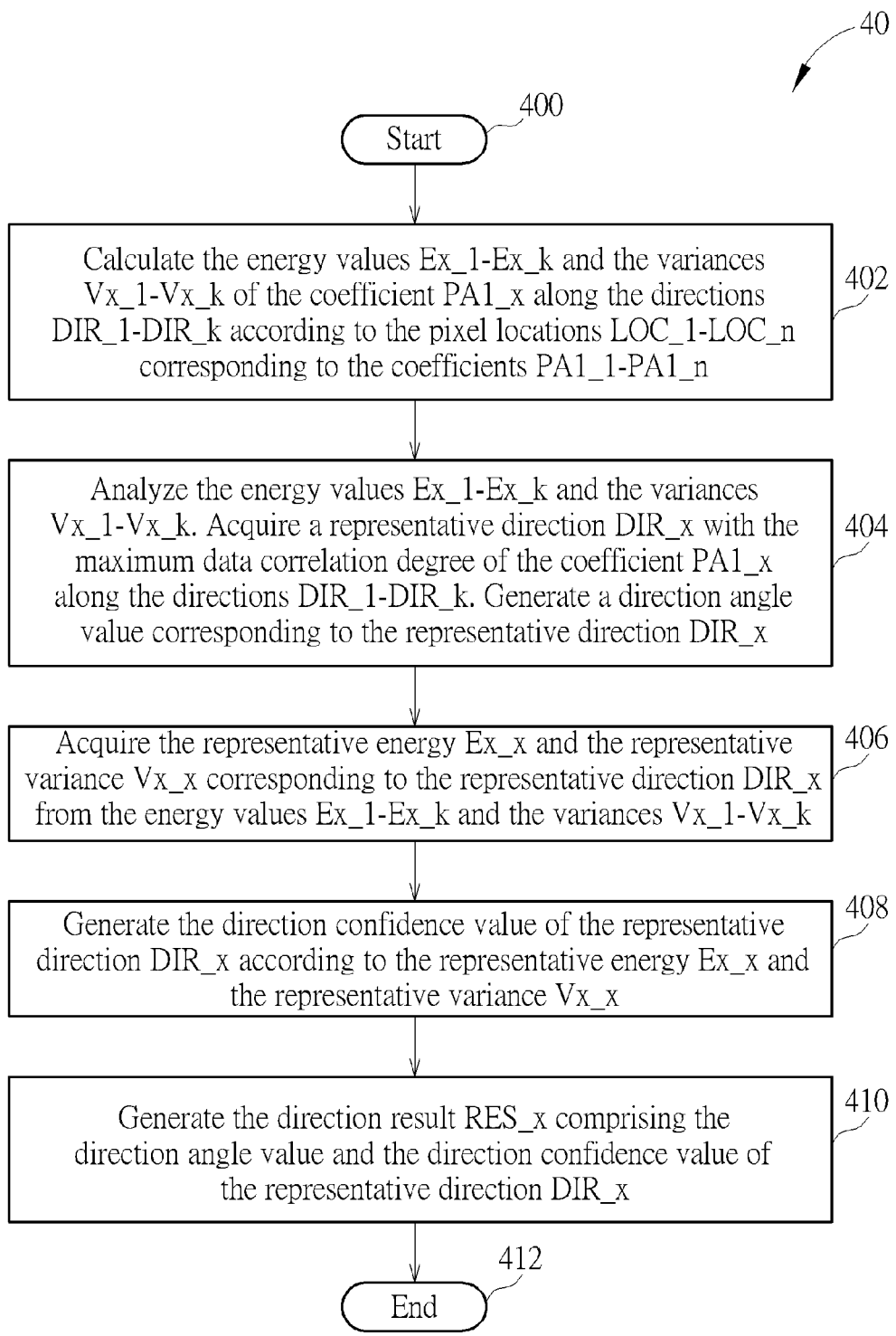
FIG. 4 is a flow chart of a direction analysis process according to an embodiment of the present invention.

The method of the data interpolation system 10 performing direction analysis process on the coefficient PA1_$x$ for generating the direction result RES_x in Step 204 can be further summarized into a direction analysis process 40. The direction analysis process 40 is performed via the analysis module 102 shown in FIG. 1, or can be compiled into the programming code and stored in storage device of the data interpolation system 10 to instruct processor (s) of the data interpolation system 10 to perform the direction analysis. As shown in FIG. 4, the direction analysis process 40 comprises the following steps:

Step 400: Start.

Step 402: Calculate the energy values Ex_1-Ex_k and the variances Vx_1-Vx_k of the coefficient PA1_$x$ along the directions DIR_1-DIR_k according to the pixel locations LOC_1-LOC_n corresponding to the coefficients PA1_1-PA1_$n$.

Step 404: Analyze the energy values Ex_1-Ex_k and the variances Vx_1-Vx_k. Acquire a representative direction DIR_x with the maximum data correlation degree of the coefficient PA1_$x$ along the directions DIR_1-DIR_k. Generate a direction angle value corresponding to the representative direction DIR_x.

Step 406: Acquire the representative energy Ex_x and the representative variance Vx_x corresponding to the representative direction DIR_x from the energy values Ex_1-Ex_k and the variances Vx_1-Vx_k.

Step 408: Generate the direction confidence value of the representative direction DIR_x according to the representative energy Ex_x and the representative variance Vx_x.

Step 410: Generate the direction result RES_x comprising the direction angle value and the direction confidence value of the representative direction DIR_x.

Step 412: End.

The details of each step of the direction analysis process 40 can be referred to the relative paragraphs of embodiments stated above, and are not narrated herein for brevity. Moreover, the data interpolation system 10 performs the direction analysis on each of the coefficients PA1_1-PA1_$n$ according to the direction analysis process 40, for generating the direction results RES_1-RES_n corresponding to the coefficients PA1_1-PA1_$n$.

After the data interpolation system 10 generates the direction results RES_1-RES_n corresponding to the coefficients PA1_1-PA1_n according to Step 204 of the data interpolation process 20, the data interpolation system 10 further performs the first interpolation process on the coefficients PA1_1-PA1_n according to the direction results RES_1-RES_n in Step 206, for generating the interpolated coefficients TP1_1-TP1_g interpolated between the coefficients PA1_1-PA1_n. In the first interpolation process, the data interpolation system 10 acquires related decision coefficients from the coefficients PA1_1-PA1_n according to the direction results RES_1-RES_n of the coefficients PA1_1-PA1_n, and gathers statistics and operations on the related decision coefficients for acquiring interpolation direction results of the interpolated coefficients TP1_1-TP1_g. According to the interpolation direction results of the interpolated coefficients TP1_1-TP1_g, the data interpolation system 10 acquires related operation coefficients from the coefficients PA1_1-PA1_n, to perform directional interpolation operations and generate directional interpolation values of the interpolated coefficients TP1_1-TP1_g. Meanwhile, the data interpolation system 10 also performs an isotropic interpolation operation based on the related operation coefficients acquired from the coefficients PA1_1-PA1_n according to linear algorithm, for generating isotropic interpolation values of the interpolated coefficients TP1_1-TP1_g. Finally, the data interpolation system 10 performs combination operations on the directional interpolation values and the isotropic interpolation values of the interpolated coefficients TP1_1-TP1_g according to the interpolation direction confidence values of the interpolation direction results of the interpolated coefficients TP1_1-TP1_g, for generating the interpolated coefficients TP1_1-TP1_g. Furthermore, the data interpolation system 10 combines the interpolated coefficients TP1_1-TP1_g with the coefficients PA1_1-PA1_n, for generating the destination coefficients IP1_1-IP1_m.

The following description takes an interpolated coefficient TP1_x of the interpolated coefficients TP1_1-TP1_g as an example. The data interpolation system 10 acquires an interpolation location TLOC_x of the interpolated coefficient TP1_x. Next, the data interpolation system 10 acquires decision coefficients DT_1-DT_j around the interpolation location TLOC_x from the coefficients PA1_1-PA1_n according to the location information of the coefficients PA1_1-PA1_n. A number of the decision coefficients DT_1-DT_j may vary according to different application. In addition, other than obtaining the decision coefficients DT_1-DT_j the neighborhood of the interpolation location TLOC_x, the data interpolation system 10 also can obtain the decision coefficients DT_1-DT_j from a pre-determined block which the interpolation location TLOC_x locates at. The method of obtaining the decision coefficients DT_1-DT_j can be accordingly modified.

The data interpolation system 10 acquires decision results corresponding to the decision coefficients DT_1-DT_j from the direction results RES_1-RES_n of the coefficients PA1_1-PA1_n. The decision results comprise the direction angle values DTA_1-DTA_j and the direction confidence values DTB_1-DTB_j. The data interpolation system 10 gathers statistics over the direction angle values DTA_1-DTA_j, for acquiring a statistical mode of direction angle values, wherein the statistical mode is the most frequent appeared direction angle value among the direction angle values DTA_1-DTA_j. The statistical mode of direction angle values is the interpolation direction angle value of the interpolated coefficient TP1_x, regarded as the optimal interpolation direction of the interpolated coefficient TP1_x. The data interpolation system 10 further performs operations on the direction confidence values DTB_1-DTB_j according to the interpolation direction angle value of the interpolated coefficient TP1_x and the direction angle values DTA_1-DTA_j, for acquiring an interpolation direction confidence value of the interpolated coefficient TP1_x. For example, the data interpolation system 10 determines whether the direction angle values DTA_1-DTA_j corresponding to the direction confidence values DTB_1-DTB_j equal the interpolation direction angle value of the interpolated coefficient TP1_x and accordingly generates the decision results. The data interpolation system 10 multiplies the direction confidence values of the direction confidence values DTB_1-DTB_n by 0 when the decision results indicate that the direction angle values DTA_1-DTA_j do not equal the interpolation direction angle value of the interpolated coefficient TP1_x, multiplies direction confidence values of the direction confidence values DTB_1-DTB_n by distance ratios related to distances between the decision coefficients DT_1-DT_j and the interpolated coefficient TP1_x when the direction angle values DTA_1-DTA_j equals the interpolation direction angle value of the interpolated coefficient TP1_x, and sums up the resulting products as the interpolation direction confidence value of the interpolated coefficient TP1_x.

Figure 5:
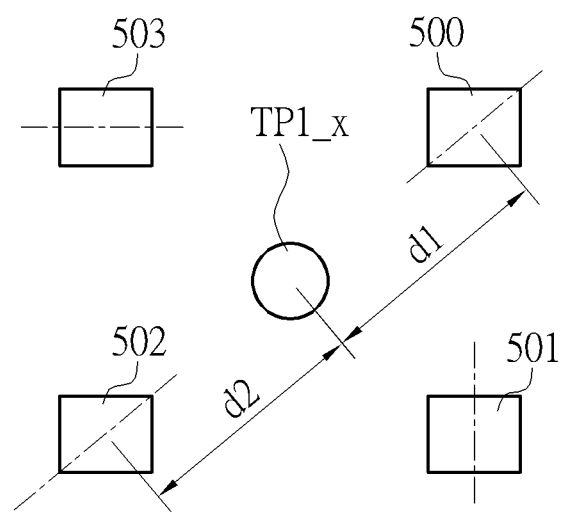
FIG. 5 is a schematic diagram of the data interpolation system shown in FIG. 1 acquires decision coefficients from a plurality of coefficients, performs statistics and operations and generates the interpolation direction results of an interpolated coefficient.

As to the details of the data interpolation system 10 acquiring the decision coefficients DT_1-DT_j from the coefficients PA1_1-PA1_n and performing statistics and operations for acquiring the interpolation direction results of the interpolated coefficient TP1_x please refer to FIG. 5. FIG. 5 is a schematic diagram of the data interpolation system 10 shown in FIG. 1 acquires decision coefficients 500-503 from the coefficients PA1_1-PA1_n, gathers statistics, performs operations and generates the interpolation direction results of the interpolated coefficient TP1_x. As shown in FIG. 5, the interpolation location TLOC_x of the interpolated coefficient TP1_x is located at the center of a block formed by the decision coefficients 500-503 of the coefficients PA1_1-PA1_n. Thus, the data interpolation system 10 regards the interpolation location TLOC_x as center, and acquires the decision coefficients 500-503 around the interpolation location TLOC_x from the coefficients PA1_1-PA1_n. From the direction results RES_1-RES_n of the coefficients PA1_1-PA1_n, the data interpolation system 10 may acquire the decision results with the direction angle values and the direction confidence values of the decision coefficients 500-503. In FIG. 5, the direction angle values of the coefficients 500-503 are 45 degrees, 90 degrees, 45 degrees, and 0 degrees, respectively (represented by dash lines in FIG. 5), and the direction confidence values of the coefficients 500-503 are 0.6, 0.2, 0.7, 0.4, respectively.

In such a condition, the data interpolation system 10 gather statistics of the direction angle values of the decision coefficients 500-503. Since the 45 degrees is the most frequently appeared direction angle value, the 45 degrees is acquired as the interpolation direction angle value of the interpolated coefficient TP1_x. Moreover, the data interpolation system 10 determines that the direction angle values of the decision coefficients 501, 503 (i.e., 90 degrees and 0 degree) are different from the interpolation direction angle value of the interpolated coefficient TP1_x(i.e., 45 degrees) and the direction angle values of the coefficients 500, 502 are equaled to the interpolation direction angle value of the interpolated coefficient TP1_x. The data interpolation system 10 therefore multiplies the direction confidence values of the coefficients 501 503 (i.e., 0.2, 0.4) by 0, and multiplies the direction confidence values of the coefficients 500502 (i.e., 0.6, 0.7) by the distance ratios related to the relative distances between the coefficients 500, 502 and the interpolated coefficient TP1_x. The data interpolation system 10 finally sums up the resulting products for acquiring the interpolation direction confidence value of the interpolated coefficient TP1_x. For example, when the distances between the coefficients 500, 502 and the interpolated coefficient TP1_x are distances d1, d2, respectively, the interpolation direction confidence value of the interpolated coefficient TP1_x may be 0.6*(d2/(d1+d2))+ 0.7*(d1/(d1+d2)). The distance ratios of the coefficients 500 and 502 are d2/(d1+d2) and d1/(d1+d2), respectively, which are inverse proportional to the distances d1 and d2.

In step 206, after the data interpolation system 10 acquires the interpolation direction results of the interpolated coefficient TP1_x comprising the interpolation direction angle value and the interpolation direction confidence value, the data interpolation system 10 generates an interpolation direction line L passing through the interpolation location TLOC_x and having the direction angle equaled to the interpolation direction angle value of the interpolated coefficient TP1_x. The data interpolation system 10 further determines whether at least one of the coefficients PA1_1-PA1_n locates on the interpolation direction line L according to the location information of the coefficients PA1_1-PA1_n. When at least one of the coefficients PA1_1-PA1_n locates on the interpolation direction line, the data interpolation system 10 acquires related operation coefficients CP1_1-CP1_u, which are on the interpolation direction line L and closest to the interpolation location TLOC_x, from the coefficients PA1_1-PA1_n and performs operations on the operation coefficients CP1_1-CP1_u, for acquiring the directional interpolation value of the interpolated coefficient TP1_x.

For example, the data interpolation system 10 acquires locations of the acquired operation coefficients CP1_1-CP1_u according to the location information of the coefficients PA1_1-PA1_n and calculates the relative distances between the locations of CP1_1-CP1_u and the interpolation location TLOC_x, for generating distances ratios of the operation coefficients CP1_1-CP1_u related to the relative distances. The data interpolation system 10 further multiplies the operation coefficients CP1_1-CP1_u by the distance ratios of the operation coefficients CP1_1-CP1_u, for generating the directional interpolation value of the interpolated coefficient TP1_x. Noticeably, the operation coefficients CP1_1-CP1_u and the interpolated coefficient TP1_x are all located on the direction line L and a total number of the acquired operation coefficients CP1_1-CP1_u can be modified according to practical requirements. In addition, algorithms of performing operations on the operation coefficients CP1_1-CP1_u on the direction line L for acquiring the directional interpolation value of the interpolated coefficient TP1_x are not limited to the abovementioned algorithm, which utilizes the linear algorithm related to the relative distances, and can be realized by other algorithms.

On the other hand, when none of the coefficients PA1_1-PA1_n locates on the direction line L, the data interpolation system 10 generates intermediate lines TL_1-TL_v passing through at least one of the coefficients PA1_1-PA1_n and parallel to the direction line L according to the location information of the coefficients PA1_1-PA1_n and acquires cross points of the intermediate lines TL_1-TL_v and a line perpendicular to the direction line L as intermediate locations LX_1-LX_v, for performing operations to acquire intermediate values on the intermediate location LX_1-LX_v. The following description takes the intermediate location LX_1 as an example. The data interpolation system 10 acquires the intermediate coefficients CP2_1-CP2_u from the coefficients PA1_1-PA1_n, which locate on the intermediate line TL_1 and are closest to the intermediate location LX_1, and performs operations on the intermediate coefficients CP2_1-CP2_u, for acquiring the intermediate value of the intermediate location LX_1. For example, the data interpolation system 10 acquires locations of the intermediate coefficients CP2_1-CP2_u according to the location information of the coefficients PA1_1-PA1_n and calculates the relative distance between the locations of the intermediate coefficients CP2_1-CP2_u and the intermediate location LX_1, for acquiring the distance ratios of the intermediate coefficients CP2_1-CP2_u related to the relative distances. The data interpolation system 10 sums up the multiplication products of the intermediate coefficients P2_1-CP2_u and the distance ratios of the intermediate coefficients P2_1-CP2_u, for generating the intermediate value of the intermediate location LX_1.

Next, the data interpolation system 10 acquires the intermediate values on the intermediate locations LX_2-LX_v of the intermediate lines TL_2-TL_v and performs operations on the intermediate values on the intermediate locations LX_1-LX_v, for generating the directional interpolation value of the interpolated coefficient TP1_x. The data interpolation system 10 may calculate the relative distances between the intermediate locations LX_1-LX_v and the interpolation location TLOC_x for acquiring distance ratios related to relative distances of the intermediate locations LX_1-LX_v and further sum up the multiplication product of the intermediate values of the intermediate locations LX_1-LX_v and the distance ratios of the intermediate locations LX_1-LX_v, to generate the directional interpolation value of the interpolated coefficient TP1_x. Noticeably, algorithms of performing operations on the coefficients on the intermediate lines TL_1-TL_v for acquiring the intermediate values of the intermediate locations LX_1-LX_v and algorithms of performing operations on the intermediate values locating on the line perpendicular to the direction line L for acquiring the directional interpolation value of the interpolated coefficient TP1_x are not limited to the abovementioned algorithm using linear algorithm related to relative distances, and can be realized by other algorithms.

The data interpolation system 10 further acquires related coefficients from the coefficients PA1_1-PA1_n, via linear algorithm, for performing the isotropic interpolation operation, to generate the isotropic interpolation value of the interpolated coefficient TP1_x. For example, the data interpolation system 10 regards the interpolation location TLOC_x as center, and acquires the operation coefficients CP3_1-CP3_u from the coefficients PA1_1-PA1_n locating around the interpolation location TLOC_x according to the location information the coefficients PA1_1-PA1_n. The number of the operation coefficients CP3_1-CP3_u can be accordingly modified, and is not limited herein. In addition to obtaining the operation coefficients CP3_1-CP3_u from the region around the interpolation location of the interpolated coefficient TP1_x, the data interpolation system 10 may change to obtain the operation coefficients CP3_1-CP3_u from a pre-determined block comprising the interpolation location TLOC_x according to the algorithm performed by the data interpolation system 10. Next, the data interpolation system 10 acquires the locations of the operation coefficients CP3_1-CP3_u according to the location information of the coefficients PA1_1-PA1_n and calculates the relative distances between the locations of the operation coefficients CP3_1-CP3_u and the interpolation location TLOC_x, so as to the acquire distance ratios related to the relative distances of the operation coefficients CP3_1-CP3_u. The data interpolation system 10 sums up the multiplication products of the operation coefficients CP3_1-CP3_u and the distance ratios of the operation coefficients CP3_1-CP3_$u$, to generate the isotropic interpolation value of the interpolated coefficient TP1_$x$.

The data interpolation system 10 performs operations on the directional interpolation value and the isotropic interpolation value of the interpolated coefficient TP1_$x$ according to the interpolation direction confidence value of the interpolated coefficient TP1_$x$, for generating the interpolated coefficient TP1_$x$. For example, the first interpolation module 104 may perform the following operations on the directional interpolation value and the isotropic interpolation value of the interpolated coefficient TP1_$x$ for generating the interpolated coefficient TP1_$x$:

Directional interpolation value=the directional interpolation value of the interpolated coefficient TP1_$x$*interpolation direction confidence value of the interpolated coefficient TP1_$x$, Isotropic interpolation value=the isotropic interpolation value of the interpolated coefficient TP1_$x$*(1−interpolation direction confidence value of the interpolated coefficient TP1_$x$), The interpolated coefficient TP1_$x$=Directional interpolation value+Isotropic interpolation value.

The algorithm of the operations performed on the interpolation direction confidence value, the directional interpolation value and the isotropic interpolation value of the interpolated coefficient TP1_$x$ for acquiring the interpolated coefficient TP1_$x$ can be modified to the algorithms comprising the operations of weighted sum of products, and are not limited herein.

The data interpolation system 10 proceeds the abovementioned first interpolation process on each of the interpolated coefficients TP1_1-TP1_$g$, for generating the interpolated coefficients TP1_1-TP1_$g$. Furthermore, the data interpolation system 10 combines the interpolated coefficients TP1_1-TP1_$g$ with the coefficients PA1_1-PA1_$n$, for generating the destination coefficients IP1_1-IP1_$m$. As a result, the data interpolation system 10 performs interpolation operations with direction characteristics on the interpolated coefficients TP1_1-TP1_$g$ between the coefficients PA1_1-PA1_$n$ according to the direction results RES_1-RES_n of the coefficients PA1_1-PA1_$n$, such that the coefficients PA1_1-PA1_$n$ with the high-frequency components can be interpolated to generate the interpolated coefficients TP1_1-TP1_$g$ in the direction with the maximum data correlation degree. The saw-toothed phenomenon of object edges of the inverse-transformed destination image 112 is therefore avoided.

Figure 6:
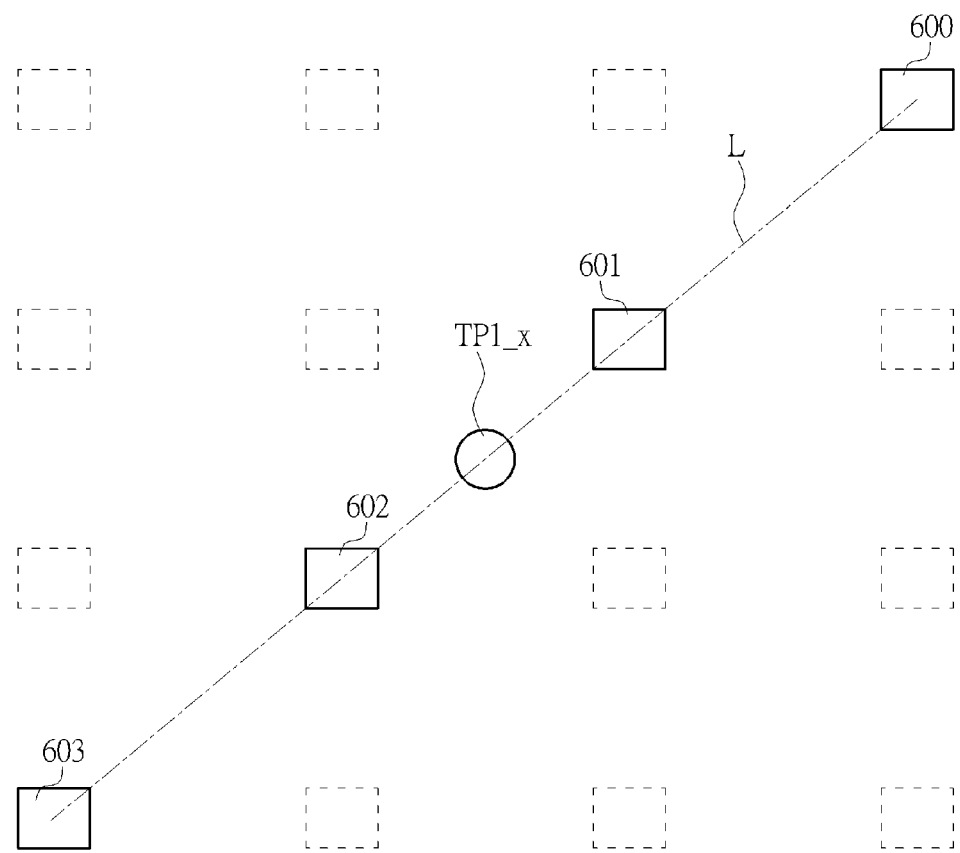
FIG. 6 is a schematic diagram of some of a plurality of coefficients shown in FIG. 1 locates on an interpolation direction line passing through an interpolated coefficient.
Figure 7:
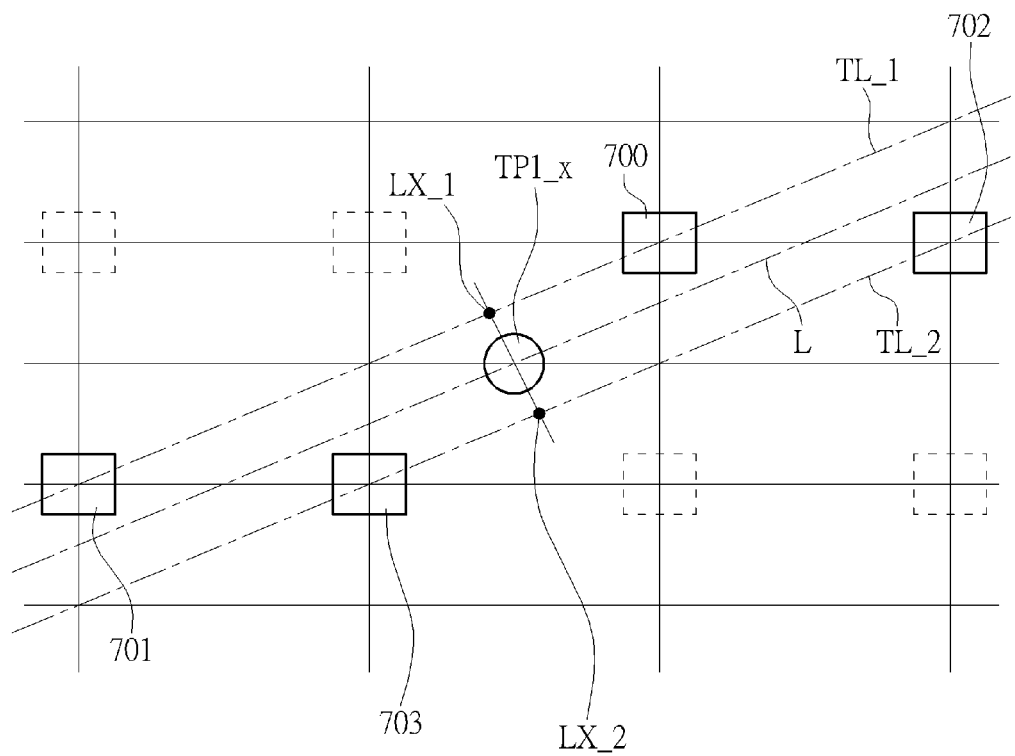
FIG. 7 is a schematic diagram of none of a plurality of coefficients shown in FIG. 1 locates on an interpolation direction line passing through an interpolated coefficient.

As to the detail operations of the data interpolation system acquiring the related coefficients from the coefficients PA1_1-PA1_$n$ for performing directional interpolation operation to generate the directional interpolation value related to the interpolated coefficient TP1_$x$ please refer to FIGS. 6 and 7. FIG. 6 is a schematic diagram of some of the coefficients PA1_1-PA1_$n$ locates on the interpolation direction line L passing through the interpolated coefficient TP1_$x$. FIG. 7 is a schematic diagram of none of the coefficients PA1_1-PA1_$n$ locates on the interpolation direction line L passing through the interpolated coefficient TP1_$x$.

As shown in FIG. 6, the interpolation direction line L are a line passing through the interpolation location TLOC_x of the interpolated coefficient TP1_$x$ and inclining with an interpolation direction angle value of the interpolated coefficient TP1_$x$(regarded as 45 degree in FIG. 6). Since some of the coefficients PA1_1-PA1_$n$ locates on the interpolation direction line L passing through the interpolated coefficient TP1_$x$, the data interpolation system 10 acquires operation coefficients 600-603 from the coefficients PA1_1-PA1_$n$ which are closest to the interpolation location TLOC_x on the interpolation direction line L and performs operations on the operation coefficients 600-603, to acquire the directional interpolation value of the interpolated coefficient TP1_$x$. The squares with the frame of dash line shown in FIG. 6 represent the coefficients of the coefficients PA1_1-PA1_$n$ which are not selected as the operation coefficients. A total number of the operation coefficients can be modified accordingly, and is not limited herein. In such a situation, the data interpolation system 10 acquires distance ratios related to the relative distances of the operation coefficients 600-603 according to the relative distances between the operation coefficients 600-603 and the interpolated coefficient TP1_$x$, and sums up the multiplication products of the operation coefficients 600-603 and the distance ratios of the operation coefficients 600-603 to generate the directional interpolation value of the interpolated coefficient TP1_$x$.

On the other hand, in FIG. 7, the interpolation direction line L are a line passing through the interpolation location TLOC_x of the interpolated coefficient TP1_$x$ and inclining with an interpolation direction angle value of the interpolated coefficient TP1_$x$(regarded as 23.5 degree in FIG. 7). Since none of the coefficients PA1_1-PA1_$n$ locates on the interpolation direction line L passing through the interpolated coefficient, the data interpolation system 10 first generates intermediate lines TL_1-TL_2 passing through some of the coefficients PA1_1-PA1_$n$ and parallel to the direction line L and acquires the cross points of the intermediate lines TL_1-TL_2 and a line perpendicular to the direction line L as the intermediate locations LX_1-LX_2. Please note that, the intermediate lines TL_1-TL_2 are lines which are passing through some of the coefficients PA1_1-PA1_$n$, parallel to the direction line L and closest to the direction line L.

Next, the data interpolation system 10 acquires intermediate coefficients 700, 701 from the coefficients PA1_1-PA1_$n$ on the intermediate line TL_1 which are closest to the intermediate location LX_1 and performs operations on the intermediate coefficients 700, 701, for acquiring the intermediate value of the intermediate location LX_1. Meanwhile, the data interpolation system 10 acquires the intermediate coefficients 702, 703 from the coefficients PA1_1-PA1_$n$ on the intermediate line TL_2 which are closest to the intermediate location LX_2 and performs operations on the intermediate coefficients 702, 703, for acquiring the intermediate value of the intermediate location LX_2. The data interpolation system 10 further performs operations on the intermediate values of the intermediate locations LX_1-LX_2, to generate the directional interpolation value of the interpolated coefficient TP1_$x$. Algorithms of the operations performed on the intermediate coefficients 700, 701 for acquiring the intermediate value on the intermediate location LX_1 those performed on the intermediate coefficients 702-703 for acquiring the intermediate value on the intermediate location LX_2, and those performed on the intermediate values on the intermediate locations LX_1-LX_2 for generating the directional interpolation value of the interpolated coefficient TP1_$x$ may first acquire the distance ratios related to the relative distances and then sum up the multiplication products of the coefficients and the distance ratios as described above. The detailed operations can be referred to the above and are not narrated herein for brevity.

Figure 8:
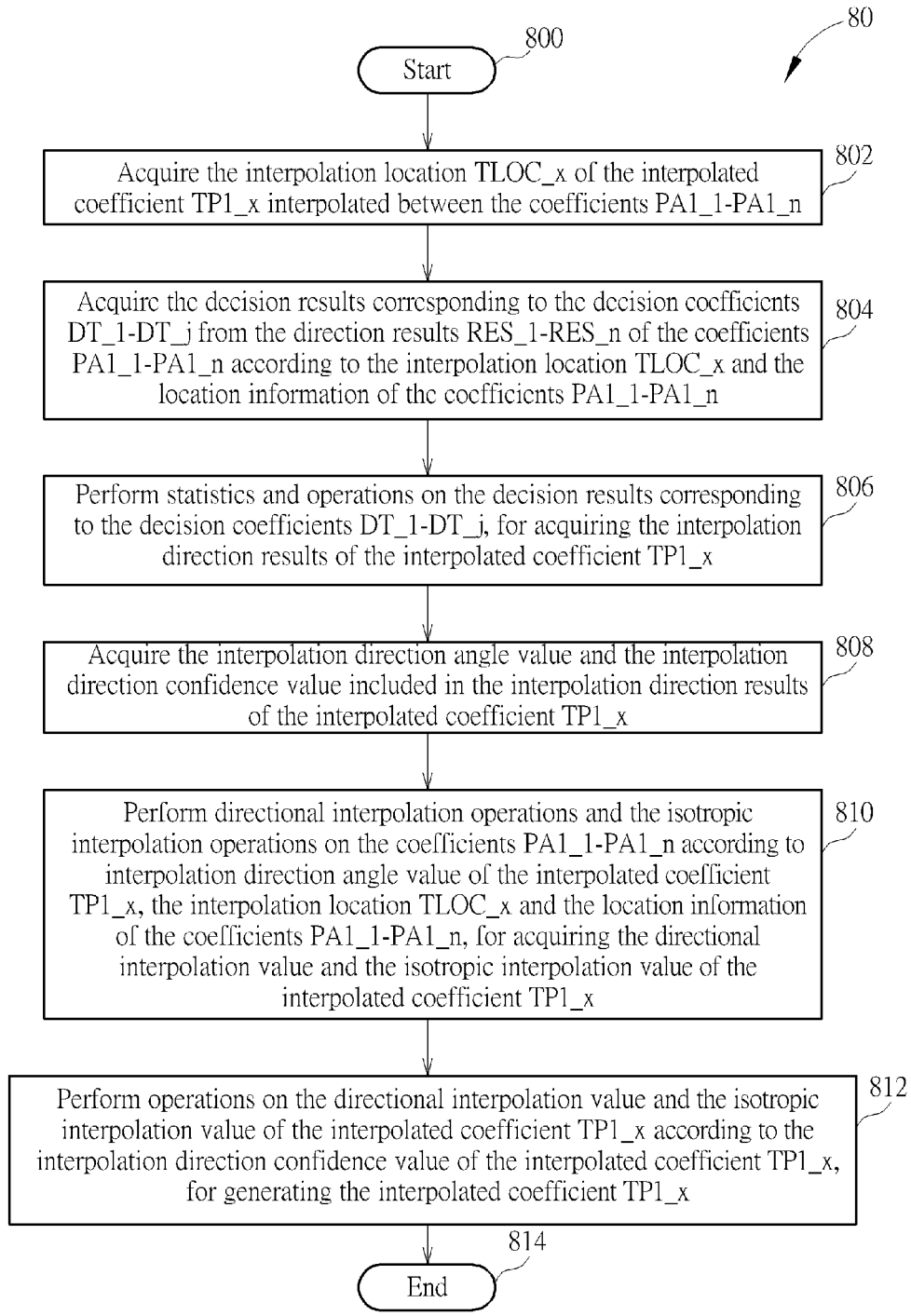
FIG. 8 is a flowchart of a first interpolation process according to an embodiment of the present invention.

The method of the data interpolation system 10 performing the first interpolation process on the interpolated coefficient TP1_$x$ for generating the interpolated coefficient TP1_$x$ in step 106 can be summarized into a first interpolation process 80. The first interpolation process 80 is performed via the first interpolation module 104 shown in FIG. 1, or it can be compiled into a programming code and stored in the storage device of the data interpolation system 10 for instructing the processor(s) of the data interpolation system 10 to perform the interpolation operations. As shown in FIG. 8, the first interpolation process 80 comprises the following steps:

Step 800: Start.

Step 802: Acquire the interpolation location TLOC_x of the interpolated coefficient TP1_x interpolated between the coefficients PA1_1-PA1_n.

Step 804: Acquire the decision results corresponding to the decision coefficients DT_1-DT_j from the direction results RES_1-RES_n of the coefficients PA1_1-PA1_n according to the interpolation location TLOC_x and the location information of the coefficients PA1_1-PA1_n.

Step 806: Perform statistics and operations on the decision results corresponding to the decision coefficients DT_1-DT_j, for acquiring the interpolation direction results of the interpolated coefficient TP1_x.

Step 808: Acquire the interpolation direction angle value and the interpolation direction confidence value included in the interpolation direction results of the interpolated coefficient TP1_x.

Step 810: Perform directional interpolation operations and the isotropic interpolation operations on the coefficients PA1_1-PA1_n according to interpolation direction angle value of the interpolated coefficient TP1_x, the interpolation location TLOC_x and the location information of the coefficients PA1_1-PA1_n, for acquiring the directional interpolation value and the isotropic interpolation value of the interpolated coefficient TP1_x.

Step 812: Perform operations on the directional interpolation value and the isotropic interpolation value of the interpolated coefficient TP1_x according to the interpolation direction confidence value of the interpolated coefficient TP1_x, for generating the interpolated coefficient TP1_x.

Step 814: End.

The details of each step of the first interpolation process 80 can be referred to the related paragraphs of the above embodiments, and are not narrated herein for brevity. Moreover, the data interpolation system 10 performs the interpolation operations on each of the interpolated coefficients TP1_1-TP1_g according to the first interpolation process 80, so as to generate the interpolated coefficients TP1_1-TP1_g. In addition, the data interpolation system 10 further combines the interpolated coefficients TP1_1-TP1_g with the coefficients PA1_1-PA1_n, for generating the destination coefficients IP1_1-IP1_m.

After generating the destination coefficients IP1_1-IP1_m by the data interpolation system 10 according to Step 206 of the data interpolation process 20, the data interpolation system 10 performs the second interpolation process on the coefficients PA2_1-PA2_n in Step 208, for generating the interpolated coefficients TP2_1-TP2_g interpolated between the coefficients PA2_1-PA2_n. In the second interpolation process, the data interpolation system 10 acquires related coefficients from the coefficients PA2_1-PA2_n based on linear algorithm for performs common interpolation operation, so as to generate the interpolated coefficients TP2_1-TP2_g. The following descriptions take an interpolated coefficient TP2_x from the interpolated coefficients TP2_1-TP2_g as an example. The data interpolation system 10 first acquires the interpolation locations of the interpolated coefficient TP2_x, regards the interpolation locations of the interpolated coefficient TP2_x as center and acquires operation coefficients CP4_1-CP4_u from the coefficients PA2_1-PA2_n around the interpolation location TLOC_x of the interpolated coefficient TP2_x according to the location information of the coefficients PA2_1-PA2_n. A number of the operation coefficients CP4_1-CP4_u can be modified and is not limited herein. Second, the data interpolation system 10 acquires locations of the operation coefficients CP4_1-CP4_u according to the location information of the coefficients PA2_1-PA2_n and calculates the relative distances between the locations of the operation coefficients CP4_1-CP4_u and the interpolation location of the interpolated coefficient TP2_x, for acquiring distance ratios related to relative distances of the operation coefficients CP4_1-CP4_u. The data interpolation system 10 sums up the multiplication products of the operation coefficients CP4_1-CP4_u and the distance ratios of the operation coefficients CP4_1-CP4_u, to generate the interpolated coefficient TP2_x.

The data interpolation system 10 further proceeds the interpolation operation on the interpolated coefficient TP2_x as described above, for generating the interpolated coefficients TP2_1-TP2_g. The data interpolation system 10 combines the interpolated coefficients TP2_1-TP2_g with the coefficients PA2_1-PA2_n, for generating the destination coefficients IP2_1-IP2_m. Since the coefficients PA2_1-PA2_n are coefficients with the low-frequency components, the second interpolation process performed by the data interpolation system 10 adopts common linear algorithms to perform interpolation operations for acquiring the interpolated coefficients TP2_1-TP2_g other than performing the interpolation operations with the direction characteristics. Method of implementing the linear algorithm can be modified accordingly, and is not limited herein.

In step 210, the data interpolation system 10 performs an inverse domain transformation on the destination coefficients IP1_1-IP1_m and IP2_1-IP2_m corresponding to the original domain in Step 202 for acquiring the pixels DP_1-DP_m of the destination image 112, so as to generate the destination image 112 with higher resolution. Please note that, the coefficients PA1_1-PA1_n represents one coefficients set of the plurality of coefficients sets with the high-frequency components and the coefficients PA2_1-PA2_n represents one coefficients set of the plurality of coefficients sets with the low-frequency components. According to different domain transformations, the data interpolation system 10 performs operations on the plurality of coefficients sets and performs the inverse transformation on the plurality of set of interpolated coefficients, for acquiring the pixels DP_1-DP_m in the destination image 112.

In brief, the image interpolation system 10 of the present invention performs a domain transformation on the pixels SP_1-SP_n of the source image 10, performs direction analysis on the plurality of sets of transformed coefficients with the high frequency components and performs the interpolation operations with the direction characteristics, to acquire the interpolated image with higher definition via performing the inverse transformation on the coefficients. According to different applications and design concepts, those with ordinary skill in the art may observe appropriate modifications and alternations. In one embodiment, the data interpolation system 10 regards the analysis location as center and acquires coefficients from the coefficients PA1_1-PA1_n via the analysis location on the directions DIR_1-DIR_k, for generating analysis information related to the directions DIR_1-DIR_k. In other embodiments, the data interpolation system 10 may also acquires coefficients from the coefficients PA1_1-PA1_n starting from the analysis location along the directions DIR_1-DIR_k, for generating the analysis information related to the directions DIR_1-DIR_k.

In an embodiment, the data interpolation system 10 determines whether direction angle values DTA_1-DTA_j corresponding to direction confidence values DTB_1-DTB_j are equaled to the interpolation direction angle value of the interpolated coefficient TP1_x, for generating the interpolation direction confidence value of the interpolated coefficient TP1_x. In another embodiment, the data interpolation system 10 may also calculate differences between the direction angle values DTA_1-DTA_j and the interpolation direction angle of the interpolated coefficient TP1_x, and performs operations on the corresponding differences and the direction confidence values DTB_1-DTB_j, for generating the interpolation direction confidence value of the interpolated coefficient TP1_x.

In an embodiment, the coefficients PA1_1-PA1_n and the coefficients PA2_1-PA2_n are differentiated as coefficients with the high-frequency components and the low-frequency components by a domain transformation such as wavelet transformation. In another embodiment the coefficients appropriated for interpolation with direction characteristics are selected as the coefficients PA1_1-PA1_n and the coefficients not appropriated for interpolation with direction characteristics are selected as the coefficients PA2_1-PA2_n according to the features of other domain transformations. Modifications can be made accordingly and is not limited herein.

To sum up, the prior art methods only perform the linear operations on the source pixels around the pixels to be interpolated and the correlation degree between source pixels on different directions has not been considered, resulting unclearness of interpolated images. In comparison, the above embodiments perform the domain transformation on a plurality of source pixels, perform the interpolation operations with the direction characteristics on the transformed coefficients and perform the inverse transformation on the coefficients. Therefore, the interpolated images with higher definition can be acquired and the saw-toothed phenomenon on the object edges of the interpolated images can be avoided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image interpolation method, for performing an interpolation on a source image to obtain a destination image, comprising:
    performing a domain transformation on a plurality of pixels of the source image, for generating a plurality of first coefficients and a plurality of second coefficients corresponding to the plurality of pixels;
    analyzing and calculating a data correlation degree in at least one direction of each first coefficient according to a plurality of pixel locations of the plurality of pixels, respectively, for generating a plurality of direction results corresponding to the plurality of first coefficients;
    performing a first interpolation process on the plurality of first coefficients according to the plurality of directional results, for generating a plurality of first destination coefficients;
    performing a second interpolation process on the plurality of first second coefficients, for generating a plurality of second destination coefficients; and
    performing an inverse domain transformation on the plurality of first destination coefficients and the plurality of second destination coefficients, for generating the plurality of destination pixels of the destination image.

2. The image interpolation method of claim 1, wherein a domain transformation is a wavelet transformation.

3. The image interpolation method of claim 2, wherein the plurality of first coefficients comprises high frequency components of the wavelet transformed results of the plurality pixels.

4. The image interpolation method of claim 1, wherein the step of analyzing and calculating the data interrelationship degree in the at least one direction of each first coefficient according to the plurality of pixel locations of the plurality of pixels, respectively, for generating the plurality of direction results corresponding to the plurality of first coefficients comprises:
    calculating at least one energy and at least one variance in the at least one direction of each first coefficient according to the plurality of pixel locations and the plurality of first coefficients;
    analyzing the at least one energy and the at least one variance, for selecting a representative direction with the maximum data correlation degree in the at least one direction of each first coefficient, and generating a direction angle value corresponding to the representative direction;
    acquiring a representative energy and a representative variance corresponding to the representative angle value from the at least one energy and the at least one variance and generating a direction confidence value of the representative direction according to the representative energy and the representative variance; and
    generating each of the plurality of direction results with the direction angle value and the direction confidence value.

5. The image interpolation method of claim 4, wherein the step of calculating the at least one energy and the at least one variance in the at least one direction of each first coefficient according to the plurality of pixel locations and the plurality of first coefficients comprises:
    acquiring an analysis location corresponding to each first coefficient from the plurality of pixel locations;
    acquiring coefficients passing through the analysis location and being on the at least one direction from the plurality of first coefficients according to the plurality of pixel locations, for generating at least one analysis data corresponding to the at least one direction;
    performing operations on each of the at least one analysis data according to an energy algorithm, respectively, for generating the at least one energy corresponding to the at least one direction; and
    performing operations on each of the at least one analysis data according to a variance algorithm, respectively, for generating the at least one variance corresponding to the at least one direction.

6. The interpolation method of claim 5, wherein the step of acquiring coefficients passing through the analysis location and being on the at least one direction from the plurality of first coefficients according to the plurality of pixel locations, for generating the at least one analysis data corresponding to the at least one direction comprises:
    acquiring a plurality of analysis coefficients passing through the analysis location and being on the analysis direction from the plurality of first coefficients according to the plurality of pixel locations; and
    generating the analysis data comprising the plurality of analysis coefficients corresponding to the analysis direction.

7. The image interpolation method of claim 6, wherein the step of performing the operations on each of the at least one analysis data according to the energy algorithm, respectively, for generating the at least one energy corresponding to the at least one direction comprises:

summing the absolute value or the square value of the plurality of the analysis coefficients of the analysis data, for generating a sum; and dividing the sum by a number of the analysis coefficients, for generating the energy.

8. The image interpolation method of claim 6, wherein the step of performing the operations on each of the at least one analysis data according to the variance algorithm, respectively, for generating the at least one variance corresponding to the at least one direction comprises:

averaging the plurality of analysis coefficients of the analysis data, for generating an average;

summing the absolute value or the square value of each of the plurality of analysis coefficients subtracts the average, for generating a sum; and dividing the sum by a number of analysis coefficients, for generating the variance.

9. The image interpolation method of claim 4, wherein the step of analyzing the at least one energy and the at least one variance, for selecting a representative direction with the maximum data correlation degree in the at least one direction of each first coefficient, and generating a direction angle value corresponding to the representative direction comprises:

analyzing the at least one energy, for acquiring the direction corresponding to a maximum energy among the at least one direction as the representative direction; or analyzing the at least one variance, for acquiring the direction corresponding to a minimum variance among the at least one direction as the representative direction; or performing operations on the at least one energy and the at least one variance, for generating at least one operation value, and analyzing the at least one operation value, for acquiring the direction with the operation value corresponding to a predefined value among the at least one direction as the representative direction.

10. The image interpolation method of claim 4, wherein the step of generating the direction confidence value of the representative direction according to the representative energy and the representative variance comprises:

dividing the difference between the representative energy and representative variance by the representative energy, for generating a representative confidence value; and limiting the representative confidence value to be within 0 and 1, for generating the direction confidence value.

11. The image interpolation method of claim 1, wherein the first interpolation process comprises:

performing operations on the plurality of first coefficients according to the plurality of direction results, for respectively generating each of a plurality of first interpolated coefficients between the pixel locations corresponding to the plurality of first coefficients; and generating the plurality of first destination coefficients with the plurality of first coefficients and the plurality of first interpolated coefficients.

12. The image interpolation method of claim 11, wherein the step of performing operations on the plurality of first coefficients according to the plurality of direction results, for respectively generating each of the plurality of first interpolated coefficients between the pixel locations corresponding to the plurality of first coefficients comprises:

acquiring an interpolation location of each first interpolated coefficient interpolated between the plurality of pixel locations;

acquiring at least one decision result from the plurality of direction results according to the interpolation location and the plurality of pixel locations corresponding to the plurality of first coefficients;

gathering statistics and operations over the at least one decision result, for acquiring an interpolation direction result of each of the first interpolated coefficients; and performing a first interpolation operation on the plurality of first coefficients according to the interpolation direction results, the interpolation locations and the plurality of pixel locations, for generating each of the plurality of first interpolated coefficients.

13. The image interpolation method of claim 12, wherein the step of acquiring the at least one decision result from the plurality of direction results according to the interpolation location and the plurality of pixel locations corresponding to the plurality of first coefficients comprises:

acquiring at least one decision coefficients from the plurality of first coefficients around the interpolation location according to the plurality of pixel locations; and acquiring the at least one decision result corresponding to the at least one decision coefficient from the plurality of direction results corresponding to the plurality of first coefficients.

14. The image interpolation method of claim 12, wherein the step of gathering statistics and operations over the at least one decision result, for acquiring the interpolation direction result of each of the first interpolated coefficients comprises:

acquiring at least one decision direction angle value and at least one decision direction confidence value comprised in the at least one decision result;

gathering statistics over the at least one decision direction angle value, for acquiring the mode of the at least one decision angle as an interpolation direction angle value;

performing operations on the at least one decision direction confidence value according to the interpolation direction angle value, for generating an interpolation direction confidence value; and acquiring the interpolation direction results comprising the interpolation direction angle value and the interpolation direction confidence value.

15. The image interpolation method of claim 12, wherein the step of performing the first interpolation operation on the plurality of first coefficients according to the interpolation direction results, the interpolation locations and the plurality of pixel locations, for generating each of the plurality of first interpolated coefficients comprises:

acquiring an interpolation direction angle value and an interpolation direction confidence value comprised in the interpolation direction results;

performing a directional interpolation on the plurality of first coefficients according to the interpolation direction angle value, the interpolation location and the plurality of pixel locations, for generating a directional interpolation value;

performing an isotropic interpolation on the plurality of first coefficients according to the interpolation location and the plurality of pixel locations, for generating an isotropic interpolation value; and performing operations on the directional interpolation value and the isotropic interpolation value according to the interpolation direction confidence value, for generating each of the plurality of first interpolated coefficients.

16. The image interpolation method of claim 15, wherein the step of performing the directional interpolation on the plurality of first coefficients according to the interpolation direction angle value, the interpolation location and the plurality of pixel locations, for generating the directional interpolation value comprises:

acquiring an interpolation direction line passing through the interpolation location and comprising the interpolation direction angle value;

determining whether the plurality of first coefficients comprises at least one first coefficient locating on the interpolation line according to the plurality of locations corresponding to the plurality of first coefficients; and performing a first directional operation on the plurality of first coefficients when the plurality of first coefficients comprises at least one first coefficient locating on the interpolation line for generating the directional interpolation value, and performing a second directional operation on the plurality of first coefficients when the plurality of first coefficients does not comprise the first coefficient locating on the interpolation line for generating the directional interpolation value.

17. The image interpolation method of claim 16, wherein the step of performing the first directional operation on the plurality of first coefficients when the plurality of first coefficients comprises at least one first coefficient locating on the interpolation line for generating the directional interpolation value comprises:

acquiring at least one first coefficient around the interpolation location as at least one operation coefficient according to the plurality of locations;

calculating at least one relative distance between the at least one operation coefficient and each first interpolated coefficient according to the plurality of locations and the interpolation location, for generating at least one distance ratio corresponding to the at least one relative distance; and summing the products of the at least one operation coefficient and the corresponding at least one distance ratio, for generating the directional interpolation value.

18. The image interpolation method of claim 16, wherein the step of performing the second directional operation on the plurality of first coefficients when the plurality of first coefficients does not comprise the first coefficient locating on the interpolation line for generating the directional interpolation value comprises:

generating at least one intermediate line which is parallel to the interpolation direction line and comprises at least one first coefficient of the plurality of first coefficients, according to the plurality of locations;

acquiring a reference line which is perpendicular to the interpolation direction line and passes through the interpolation location;

acquiring at least one intersection of the at least one intermediate line and the reference line as at least one intermediate location;

performing operations on at least one intermediate coefficient, which is the first coefficient locating on the at least one intermediate line, according to each intermediate location and the plurality of locations, for generating an intermediate value corresponding to each intermediate location; and performing operations on the at least one intermediate value according to the interpolation location and the at least one intermediate location, for generating the directional interpolation value.

19. The image interpolation method of claim 18, wherein the step of performing operations on the at least one intermediate coefficient, which is the first coefficient locating on the at least one intermediate line, according to each intermediate location and the plurality of locations, for generating the intermediate value corresponding to each intermediate location comprises:

calculating at least one relative distance between the at least one intermediate coefficient and the intermediate value according to the plurality of locations and each intermediate location, for generating at least one distance ratio corresponding to the at least one relative distance; and summing products of the at least one intermediate coefficient and the corresponding at least one distance ratio, for generating the intermediate value corresponding to each intermediate location.

20. The image interpolation method of claim 18, wherein the step of performing operations on the at least one intermediate value according to the interpolation location and the at least one intermediate location, for generating the directional interpolation value comprises:

calculating at least one relative distance between the at least one intermediate coefficient and each first interpolated coefficient according to the at least one intermediate location and the interpolation location, for generating at least one distance ratio corresponding to the at least one relative distance; and summing products of the at least one intermediate value and the corresponding at least one distance ratio, for generating the directional interpolation value.

21. The image interpolation method of claim 15, wherein the step of performing the isotropic interpolation on the plurality of first coefficients according to the interpolation location and the plurality of pixel locations, for generating the isotropic interpolation value comprises:

acquiring at least one first coefficient around the interpolation position as at least one operation coefficient according to the plurality of locations;

calculating at least one relative distance between the at least one operation coefficient and each first interpolated coefficient according to the plurality of locations and the interpolation location, for generating at least one distance ratio corresponding to the at least one relative distance; and summing products of the at least one operation coefficient and the corresponding at least one distance ratio, for generating the isotropic interpolation value.

22. The image interpolation method of claim 15, wherein the step of performing operation on the directional interpolation value and the isotropic interpolation value according to the interpolation direction confidence value, for generating each of the first interpolated coefficients comprises:

calculating 1 minus the interpolation directional confidence value, for generating a complementary interpolation direction value;

multiplying the directional interpolation value by the interpolation directional confidence value, for generating a directional operation value;

multiplying the isotropic interpolation value by the complementary interpolation directional confidence value, for generating an isotropic operation value; and adding the directional operation value to the isotropic operation value, for generating each first of the plurality of interpolated coefficients.

23. The image interpolation method of claim 1, wherein the second interpolation process comprises:

performing operations on the plurality of second coefficients, for generating each of the plurality of second interpolated coefficients interpolated between the pixel locations corresponding to the plurality of second coefficients; and generating the plurality of second destination coefficients comprising the plurality of second coefficients and the plurality of second interpolated coefficients.

24. The image interpolation method of claim 23, wherein the step of performing operations on the plurality of second coefficients, for generating each of the plurality of second interpolated coefficients interpolated between the pixel locations corresponding to the plurality of second coefficients comprises:
- acquiring an interpolation location of each second interpolated coefficient interpolated between the plurality of pixel locations;
- acquiring at least one second coefficient around the interpolation position as at least one operation coefficient according to the plurality of pixel locations;
- calculating at least one relative distance between the at least one operation coefficient and each second interpolated coefficient according to the plurality of locations and the interpolation location, for generating at least one distance ratio corresponding to the at least one relative distance; and
- summing products of the at least one operation coefficient and the corresponding at least one distance ratio, for generating each second interpolated coefficient.

25. An image interpolation system, for interpolating a source image to obtain a destination image, comprising:
- a transformation module, performing a domain transformation on a plurality of pixels of the source image, for generating a plurality of first coefficients and a plurality of second coefficients corresponding to the plurality of pixels;
- an analysis module, coupled to the domain transformation module, for analyzing and calculating a data correlation degree in at least one direction of each first coefficient according to a plurality of pixel locations of the plurality of pixels, respectively, for generating a plurality of direction results corresponding to the plurality of first coefficients;
- a first interpolation module, coupled to the domain transformation module and the analysis module, for performing a first interpolation process on the plurality of first coefficients according to the plurality of directional results, for generating a plurality of first destination coefficients;
- a second interpolation module, coupled to the domain transformation module, for performing a second interpolation process on the plurality of first second coefficients, for generating a plurality of second destination coefficients; and
- an inverse transformation module, coupled to the first interpolation module and the second interpolation module, for performing an inverse domain transformation on the plurality of first destination coefficients and the plurality of second destination coefficients, for generating the plurality of destination pixels of the destination image.

* * * * *